US009351288B2

(12) United States Patent
Pi

(10) Patent No.: US 9,351,288 B2
(45) Date of Patent: May 24, 2016

(54) UPLINK CHANNEL SOUNDING AND CHANNEL STATE INFORMATION ESTIMATION IN MOBILE COMMUNICATION SYSTEMS WITH MULTIPLE ANTENNAS

(71) Applicant: Samsung Electronics Co., Ltd., Gyeonggi-do (KR)

(72) Inventor: Zhouyue Pi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 13/908,601

(22) Filed: Jun. 3, 2013

(65) Prior Publication Data
US 2013/0322280 A1 Dec. 5, 2013

Related U.S. Application Data

(60) Provisional application No. 61/655,920, filed on Jun. 5, 2012, provisional application No. 61/667,209, filed on Jul. 2, 2012.

(51) Int. Cl.
*H04W 72/04* (2009.01)
*H04W 56/00* (2009.01)
(Continued)

(52) U.S. Cl.
CPC ...... *H04W 72/0413* (2013.01); *H04W 56/0005* (2013.01); *H04L 1/0026* (2013.01); *H04W 28/06* (2013.01); *H04W 56/0035* (2013.01); *H04W 72/12* (2013.01); *H04W 88/08* (2013.01)

(58) Field of Classification Search
CPC ..................... H04W 72/0413; H04W 56/0005; H04W 48/00; H04W 56/0035; H04W 88/08; H04W 28/06; H04W 72/12; H04L 1/00

USPC ............ 370/210, 260, 277, 328, 329; 455/39
See application file for complete search history.

(56) References Cited

U.S. PATENT DOCUMENTS 8,099,132 B2 * 1/2012 Kim et al. ................... 455/562.1
8,891,470 B2 * 11/2014 Chun ..................... H04L 5/0007
370/252

(Continued)

FOREIGN PATENT DOCUMENTS

KR WO 2011/152685 A2 * 6/2011 .............. H04J 11/00
WO WO 2011/096744 A2 8/2011

OTHER PUBLICATIONS

International Search Report dated Oct. 10, 2013 in connection with International Patent Application No. PCT/KR2013/004950, 3 pages.
(Continued)

*Primary Examiner* — Noel Beharry
*Assistant Examiner* — Rodrick Mak

(57) ABSTRACT

A system includes a base station configured to communicate with a plurality of mobile stations. The base station transmits downlink timing synchronization and establishes frequency synchronization with at least one of the plurality of mobile stations. The base station receives, from the mobile station, at least one of: coarse sounding reference signal (SRS), and fine SRS. The base processes at least one of the coarse SRS to enable tracking of the preferred uplink (UL) slice for uplink transmissions, and the fine SRS in order to resolve a short-term small-scale channel state information (CSI), estimate a CSI from at least one of the coarse SRS and fine SRS, and perform uplink scheduling and grant. The mobile station performs uplink scheduling request and uplink data communication.

19 Claims, 14 Drawing Sheets

(51) Int. Cl.
*H04W 28/06* (2009.01)
*H04W 72/12* (2009.01)
*H04W 88/08* (2009.01)
*H04L 1/00* (2006.01)

(56) References Cited

U.S. PATENT DOCUMENTS

| | | | | |
|---|---|---|---|---|
| 8,982,779 | B2* | 3/2015 | Li | H04B 7/0695 370/328 |
| 2005/0068918 | A1* | 3/2005 | Mantravadi et al. | 370/328 |
| 2008/0247340 | A1* | 10/2008 | Choi et al. | 370/281 |
| 2009/0028112 | A1* | 1/2009 | Attar et al. | 370/332 |
| 2009/0042615 | A1 | 2/2009 | Teo et al. | |
| 2009/0185476 | A1* | 7/2009 | Tsai et al. | 370/210 |
| 2009/0219875 | A1* | 9/2009 | Kwak et al. | 370/329 |
| 2010/0202372 | A1* | 8/2010 | Chun et al. | 370/329 |
| 2010/0273435 | A1* | 10/2010 | Sun et al. | 455/67.13 |
| 2010/0284359 | A1* | 11/2010 | Kim et al. | 370/329 |
| 2010/0303019 | A1 | 12/2010 | Iwai et al. | |
| 2010/0309852 | A1* | 12/2010 | Li et al. | 370/328 |
| 2011/0075752 | A1* | 3/2011 | Zheng et al. | 375/267 |
| 2011/0164489 | A1* | 7/2011 | Papasakellariou et al. | 370/203 |
| 2011/0235743 | A1 | 9/2011 | Lee et al. | |
| 2011/0244877 | A1 | 10/2011 | Farajidana et al. | |
| 2012/0093089 | A1* | 4/2012 | Park et al. | 370/328 |
| 2013/0078913 | A1* | 3/2013 | Lee et al. | 455/39 |
| 2013/0182594 | A1* | 7/2013 | Kim | H04W 72/042 370/252 |
| 2013/0242911 | A1* | 9/2013 | Heo | H04L 5/001 370/329 |
| 2013/0272263 | A1* | 10/2013 | Pi | H04W 72/042 370/330 |
| 2014/0226612 | A1* | 8/2014 | Kim et al. | 370/329 |

OTHER PUBLICATIONS

Written Opinion of International Searching Authority dated Oct. 10, 2013 in connection with International Patent Application No. PCT/KR2013/004950, 4 pages.

* cited by examiner

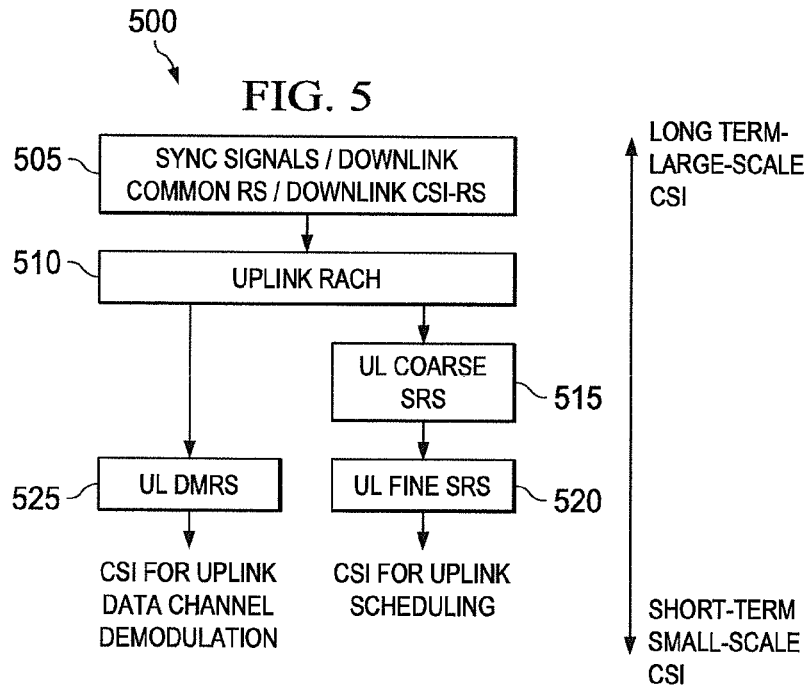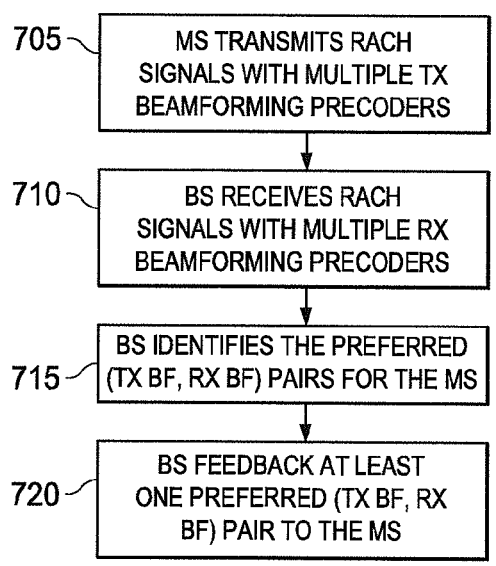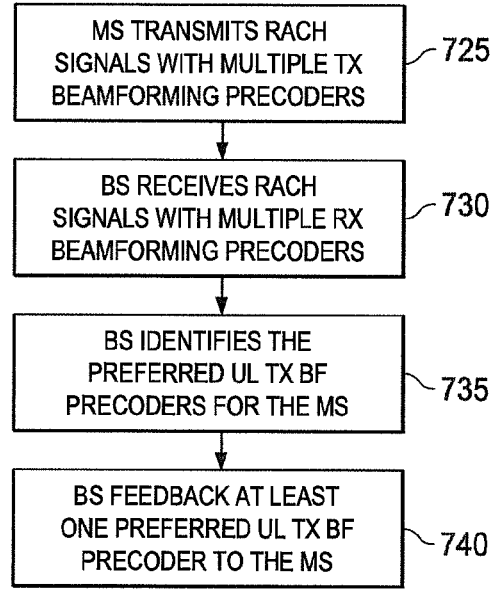

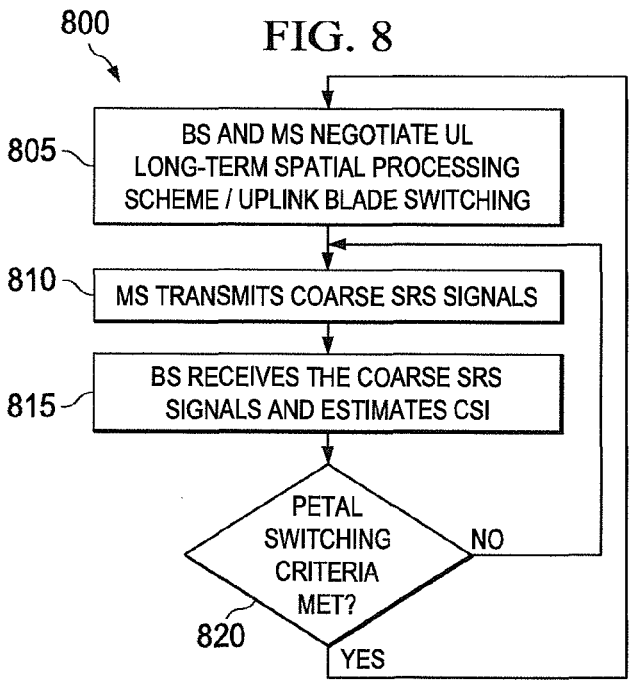
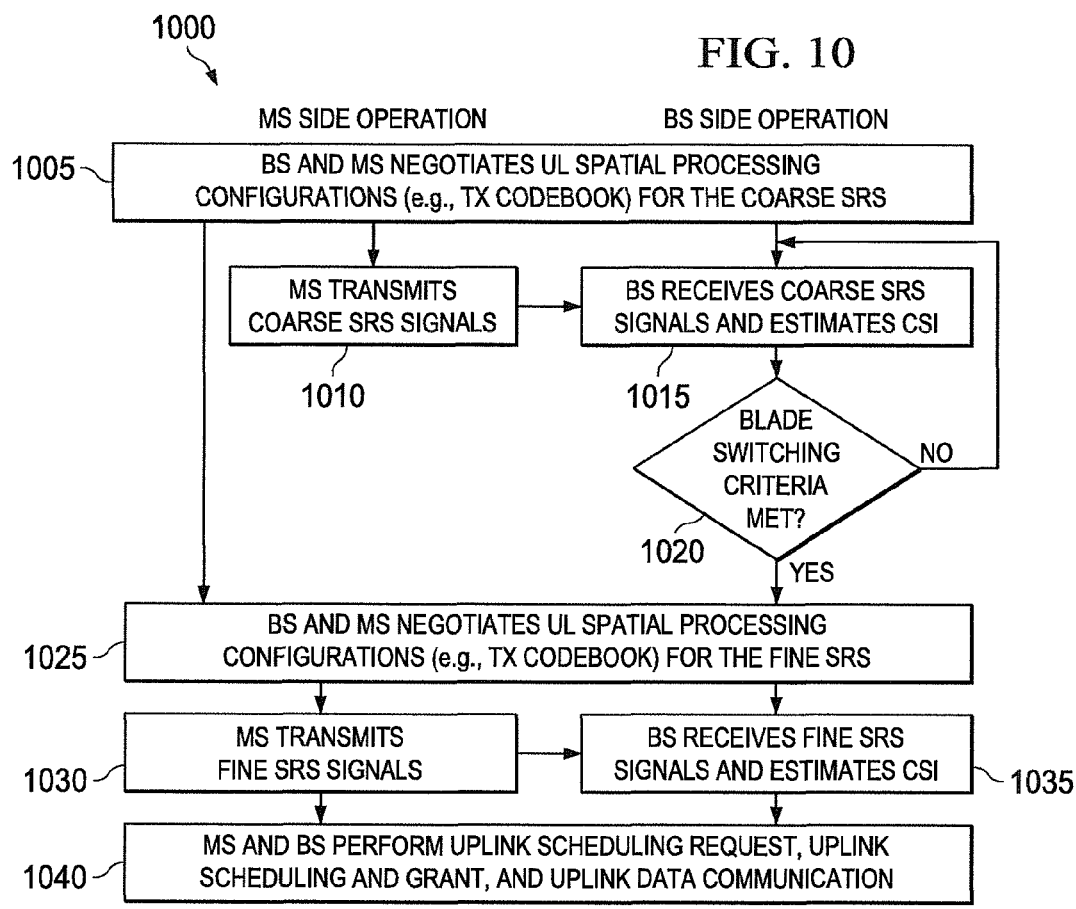

UPLINK CHANNEL SOUNDING AND CHANNEL STATE INFORMATION ESTIMATION IN MOBILE COMMUNICATION SYSTEMS WITH MULTIPLE ANTENNAS

CROSS-REFERENCE TO RELATED APPLICATION(S) AND CLAIM OF PRIORITY

The present application claims priority to U.S. Provisional Patent Application Ser. No. 61/655,920, filed Jun. 5, 2012, entitled "UPLINK CHANNEL SOUNDING AND CHANNEL STATE INFORMATION ESTIMATION IN MOBILE COMMUNICATION SYSTEMS WITH MULTIPLE ANTENNAS" and U.S. Provisional Patent Application Ser. No. 61/667,209, filed Jul. 2, 2012, entitled "UPLINK SOUNDING REFERENCE SIGNALS FOR MOBILE COMMUNICATION SYSTEMS WITH LARGE NUMBER OF ANTENNAS". The content of the above-identified patent documents is incorporated herein by reference.

TECHNICAL FIELD

The present application relates generally to wireless communications networks and, more specifically, to a system and method for uplink channel sounding and channel state information estimation.

BACKGROUND

To satisfy the explosive growth of mobile broadband data traffic, next generation mobile communication (5G) is aimed to provide 100~1000 times more capacity than 4G systems, such as Long Term Evolution (LTE), LTE-Advanced, mobile Worldwide Interoperability for Microwave Access (WiMAX) Evolution, and so forth. Two key technologies that contribute to this magnitude of improvement are massive Multiple Input Multiple Output (MIMO) technology, and millimeter-Wave (mmWave) mobile broadband, where mmWave is broadly defined as radio waves with wavelengths 1 mm-100 mm, corresponding to frequencies of 3-300 GHz. These two technologies are complementary to each other.

SUMMARY

A base station configured to communicate with a plurality of mobile stations is provided. The base station includes a transmit chain configured to transmit downlink timing synchronization and establish frequency synchronization with at least one of the plurality of mobile stations. The base station also includes a receive chain configured to receive, from the at least one of the plurality of mobile stations, at least one of: coarse sounding reference signal (SRS), and fine SRS. The base station also includes processing circuitry configured to: process at least one of the coarse SRS to enable tracking of the preferred uplink (UL) slice for uplink transmissions, and the fine SRS in order to resolve a short-term small-scale channel state information (CSI), estimate a CSI from at least one of the coarse SRS and fine SRS, and perform uplink scheduling and grant.

A mobile station configured to communicate with at least one base station is provided. The mobile station includes a transceiver configured to transmit multiple RACH probes using different uplink Tx beamforming and receive feedback from the at least one base station. The different uplink Tx beamforming includes a plurality of uplink beams and slices. The transceiver also is configured to receive communications from the base station via a plurality of downlink beams and slices. The mobile station also includes processing circuitry configured to determine at least one preferred uplink (UL) spatial processing configuration and negotiate, with the at least one base station, the at least one preferred uplink (UL) spatial processing configuration for a sounding reference signal (SRS), and perform uplink scheduling request and uplink data communication.

A method for communicating with a plurality of mobile stations is provided. The method includes transmitting downlink timing synchronization and establishing frequency synchronization with at least one of the plurality of mobile stations. The method also includes receiving, from the at least one of the plurality of mobile stations, at least one of: coarse sounding reference signal (SRS), and fine SRS. The method further includes processing at least one of the coarse SRS to enable tracking of the preferred uplink (UL) slice for uplink transmissions, and the fine SRS in order to resolve a short-term small-scale channel state information (CSI), estimate a CSI from at least one of the coarse SRS and fine SRS, and perform uplink scheduling and grant.

A method for use in a wireless communications network is provided. The method includes communicating with at least one of a plurality of mobile stations. The method also includes allocating, by a base station, a first set of time and frequency resources for a first type of uplink sounding reference signals (SRS) and a second set of time and frequency resources for a second type of uplink sounding reference signals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates uplink channel sounding for large dimensional MIMO channels according to embodiments of the present disclosure;

FIGS. 7A and 7B illustrate acquiring long-term large-scale spatial CSI information using RACH signals according to embodiments of the present disclosure;

FIG. 8 illustrates a procedure for long-term large-scale CSI tracking and update in the uplink according to embodiments of the present disclosure;

FIG. 10 illustrates an hierarchical uplink channel sounding and channel sensitive scheduling with mobility event according to embodiments of the present disclosure;

DETAILED DESCRIPTION

Figure 1:
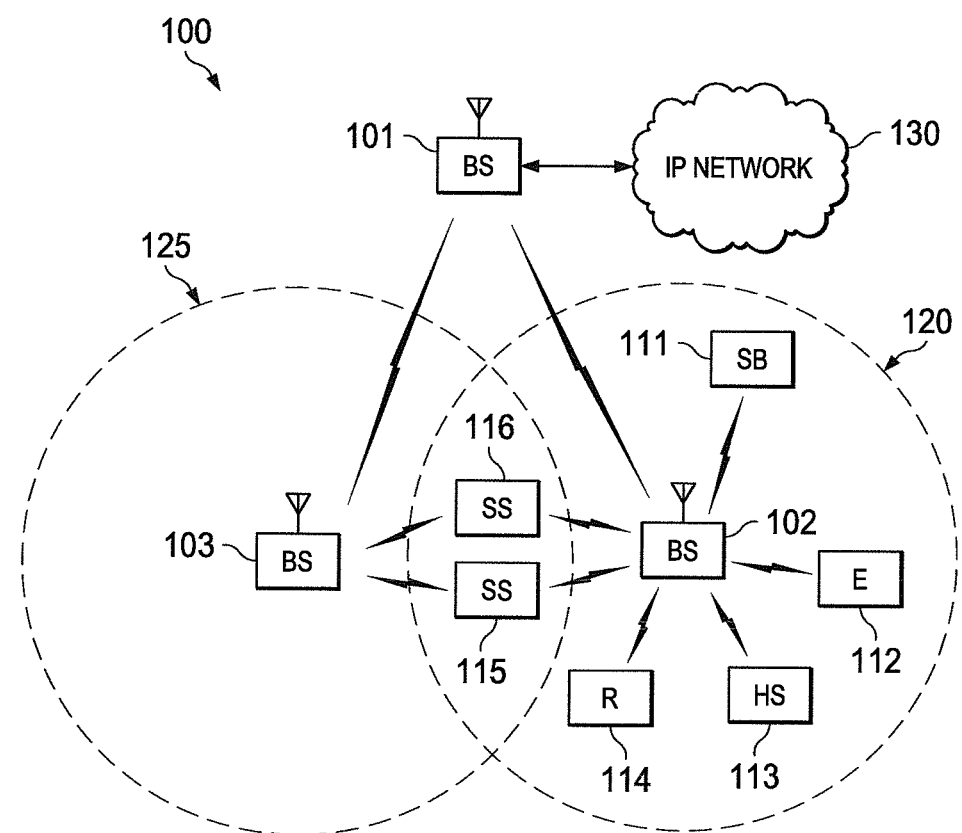
FIG. 1 illustrates an exemplary wireless network according to one embodiment of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The following documents and standards descriptions are hereby incorporated into the present disclosure as if fully set forth herein: T. L. Marzetta, "Noncooperative cellular wireless with unlimited number of base station antennas," *IEEE Trans. Wireless Communication*, vol. 9, no. 11, pp. 3590-3600, Nov. 2010 (REF 1); and Z. Pi and F. Khan, "An introduction to millimeter-wave mobile broadband systems," *IEEE Communications Magazine*, June 2011 (REF 2).

To satisfy the explosive growth of mobile broadband data traffic, next generation mobile communication (5G) is aimed to provide 100~1000 times more capacity than 4G systems (LTE/LTE-Advanced, mobile WiMAX Evolution, etc.). Two key technologies that contribute to this magnitude of improvement are Massive MIMO technology, as discussed in REF1, and mmWave mobile broadband, as discussed in REF2, are aimed to provide 100~1000 times more capacity than 4G systems. In REF2, mmWave is broadly defined as radio waves with wavelengths 1 mm-100 mm, corresponding to frequencies of 3-300 GHz.

As the communication frequencies become higher, the antennas used in base stations and mobile stations can be made smaller. This will allow more number of antennas in the same area. For example, for a mmWave mobile communication system deployed in six gigahertz (GHz), the wavelength is five centimeters (cm). The size of a half-wavelength dipole antenna is 2.5 cm. It is therefore possible to put a 256-element antenna array at the base station with the total antenna array size less than 40 cm×40 cm. At the mobile station, it is possible to put a 16-element antenna array with the total array size less than 10 cm×10 cm. As systems further move up the spectrum, it becomes possible to put thousands of antennas in a base station, and hundreds of antennas in a mobile station, all in practical form factors of the devices for mobile communication.

Spatial signal processing technologies with large number of antennas, including beamforming (BF), spatial division multiple access (SDMA), and Multiple Input Multiple Output (MIMO), are key to enable mmWave mobile broadband communication, and to improve its performance drastically beyond 4G. With large number of antennas at base stations and mobile stations, significant transmitter and receiver beamforming gains can be achieved, overcoming the pathloss disadvantage of high frequency propagation and suppressing unwanted interferences. Transmitter and receiver beamforming with large number of antennas are essential to achieve wide area coverage and high spectral efficiency for mmWave mobile communication. In addition, good spatial separation can be achieved between links from the same base station to different mobile stations in the downlink, and between links from different mobile stations to the same base station in the uplink, allowing large degree of freedom in SDMA, which in turn significantly improves system capacity. When the communication channel between a base station and a mobile station becomes sufficiently scattered, large degree of freedom can also be achieved on the point-to-point communication between the base station and the mobile station. In this case, MIMO communication with high rank can be achieved, which can significantly boost the spectral efficiency for the point-to-point communication link.

One of the key challenges for efficient beamforming/SDMA/MIMO with large number of transmitter or receiver antennas, or both, is acquiring the large amount of channel state information. For example, with 256-element antenna array at the base station and 64-element antenna array at the mobile station, the channel matrix has a dimension of 256× 64, which would be practically impossible to estimate if channel estimation were done on a per-element basis.

With regard to the following description, it is noted that the LTE terms "node B," "enhanced node B," and "eNodeB" are other terms for "base station" used below. A base station as described herein may have a globally unique identifier, known as a base station identifier (BSID). For some embodiments, the BSID may be a MAC ID. Also, a base station can have multiple cells (e.g., one sector can be one cell), each with a physical cell identifier, or a preamble sequence, which may be carried in a synchronization channel.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes a base station (BS) 101, BS102, and BS103. The BS101 communicates with BS102 and BS 103. The BS 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term "user equipment" or "UE" is used herein to designate any remote wireless equipment that wirelessly accesses an eNB and that can be used by a consumer to access services via the wireless communications network, whether the UE is a mobile device (e.g., cell phone) or is normally considered a stationary device (e.g., desktop personal computer, vending machine, etc.). In addition, the LTE term "user equipment" or "UE" is another term for "subscriber station" used below, and a "mobile station" (MS) as described herein is interchangeable with a "subscriber station." Other well know terms for the remote terminals include "remote terminal" (RT), "wireless terminal" (WT), and the like.

The BS 102 provides wireless broadband access to network 130 to a first plurality of user equipments (UEs) within coverage area 120 of BS 102. The first plurality of UEs includes MS 111, which may be located in a small business; MS 112, which may be located in an enterprise; MS 113, which may be located in a WiFi hotspot; MS 114, which may be located in a first residence; MS 115, which may be located in a second residence; and MS 116, which may be a mobile device, such as a cell phone, a wireless laptop, a wireless PDA, or the like. MSs 111-116 may be any wireless communication device, such as, but not limited to, a mobile phone, mobile PDA and any mobile station (MS).

The BS 103 provides wireless broadband access to a second plurality of UEs within coverage area 125 of BS 103. The second plurality of UEs includes MS 115 and MS 116. In some embodiments, one or more of eNBs 101-103 may communicate with each other and with MSs 111-116 using 5G, LTE, LTE-A, or WiMAX techniques including techniques for: uplink channel sounding and channel state information estimation in mobile communications systems with multiple antennas as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and MSs 111-116. Wired connections may replace the wireless connections depicted in FIG. 1.

Figure 2A:
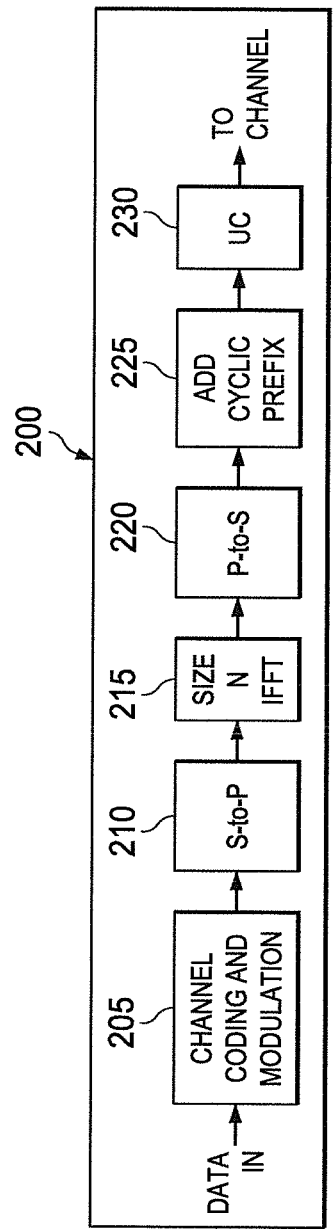
FIG. 2A illustrates a high-level diagram of a wireless transmit path according to embodiments of the present disclosure.
Figure 2B:
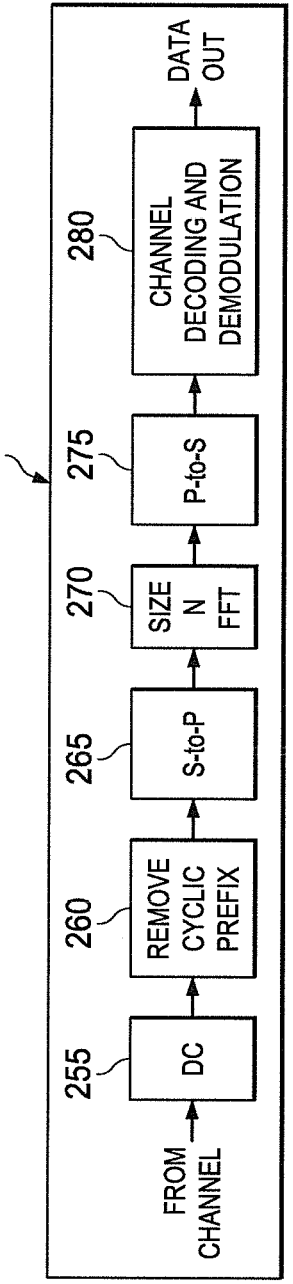
FIG. 2B illustrates a high-level diagram of a wireless receive path according to embodiments of the present disclosure.

FIG. 2A is a high-level diagram of a wireless transmit path. FIG. 2B is a high-level diagram of a wireless receive path. In FIGS. 2A and 2B, the transmit path 200 may be implemented, e.g., in BS 102 and the receive path 250 may be implemented, e.g., in a UE, such as MS 116 of FIG. 1. It will be understood, however, that the receive path 250 could be implemented in an eNB (e.g. BS 102 of FIG. 1) and the transmit path 200 could be implemented in a UE. In certain embodiments, transmit path 200 and receive path 250 are configured to perform methods for uplink channel sounding and channel state information estimation in mobile communications systems with multiple antennas as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and MS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at MS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to MSs 111-116 and may implement a receive path that is analogous to receiving in the uplink from MSs 111-116. Similarly, each one of MSs 111-116 may implement a transmit path corresponding to the architecture for transmitting in the uplink to eNBs 101-103 and may implement a receive path corresponding to the architecture for receiving in the downlink from eNBs 101-103.

Figure 3:
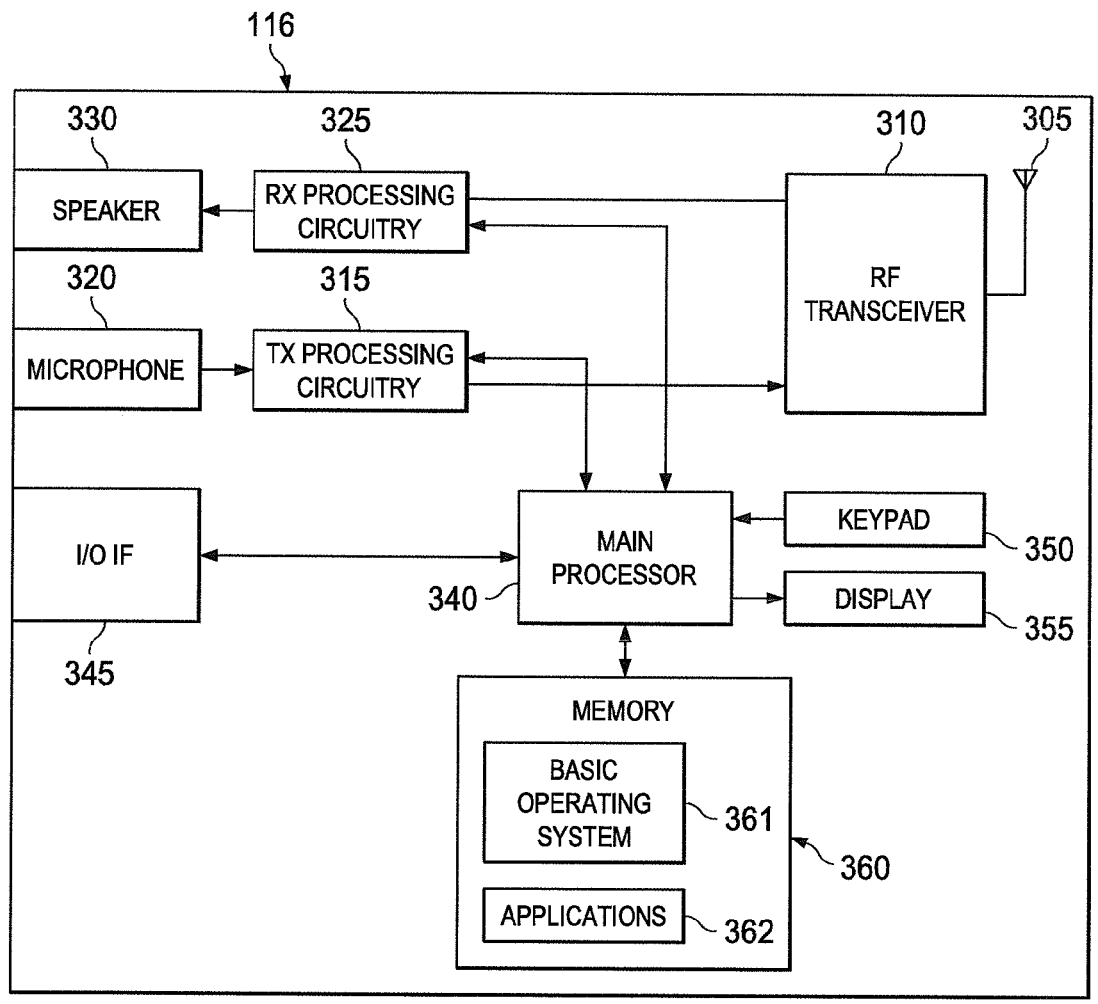
FIG. 3 illustrates a subscriber station according to embodiments of the present disclosure.

FIG. 3 illustrates a mobile station according to embodiments of the present disclosure. The embodiment of the mobile station, such as MS 116, illustrated in FIG. 3 is for illustration only. Other embodiments of the wireless mobile station could be used without departing from the scope of this disclosure. Although MS 116 is depicted by way of example, the description of FIG. 3 can apply equally to any of MS 111, MS 112, MS 113, MS 114 and MS 115.

MS 116 comprises antenna 305, radio frequency (RF) transceiver 310, transmit (TX) processing circuitry 315, microphone 320, and receive (RX) processing circuitry 325. Although shown as a single antenna, antenna 305 can include multiple antennas. MS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for uplink channel sounding and channel state information estimation in mobile communications systems with multiple antennas as described in embodiments of the present disclosure. Main processor 340 can move data into or out of memory 360, as required by an executing process. In some embodiments, the main processor 340 is configured to execute a plurality of applications 362, such as applications for CoMP communications, MU-MIMO communications, massive MIMO communications and mmWAVE communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Embodiments of the present disclosure illustrate methods and apparatus to transmit uplink channel sounding pilots (or reference signals) and to estimate (and report) channel state information in mobile communication systems with large number of transmitter and receiver antennas. Embodiments of the present disclosure generally refer to beamforming (BF), spatial division multiple access (SDMA), and Multiple Input Multiple Output (MIMO) as spatial processing. For the purpose of illustration, many embodiments are described using Tx and Rx beamforming as examples. However, these embodiments are equally applicable to cases when SDMA and MIMO are used as spatial processing techniques.

Figure 4:
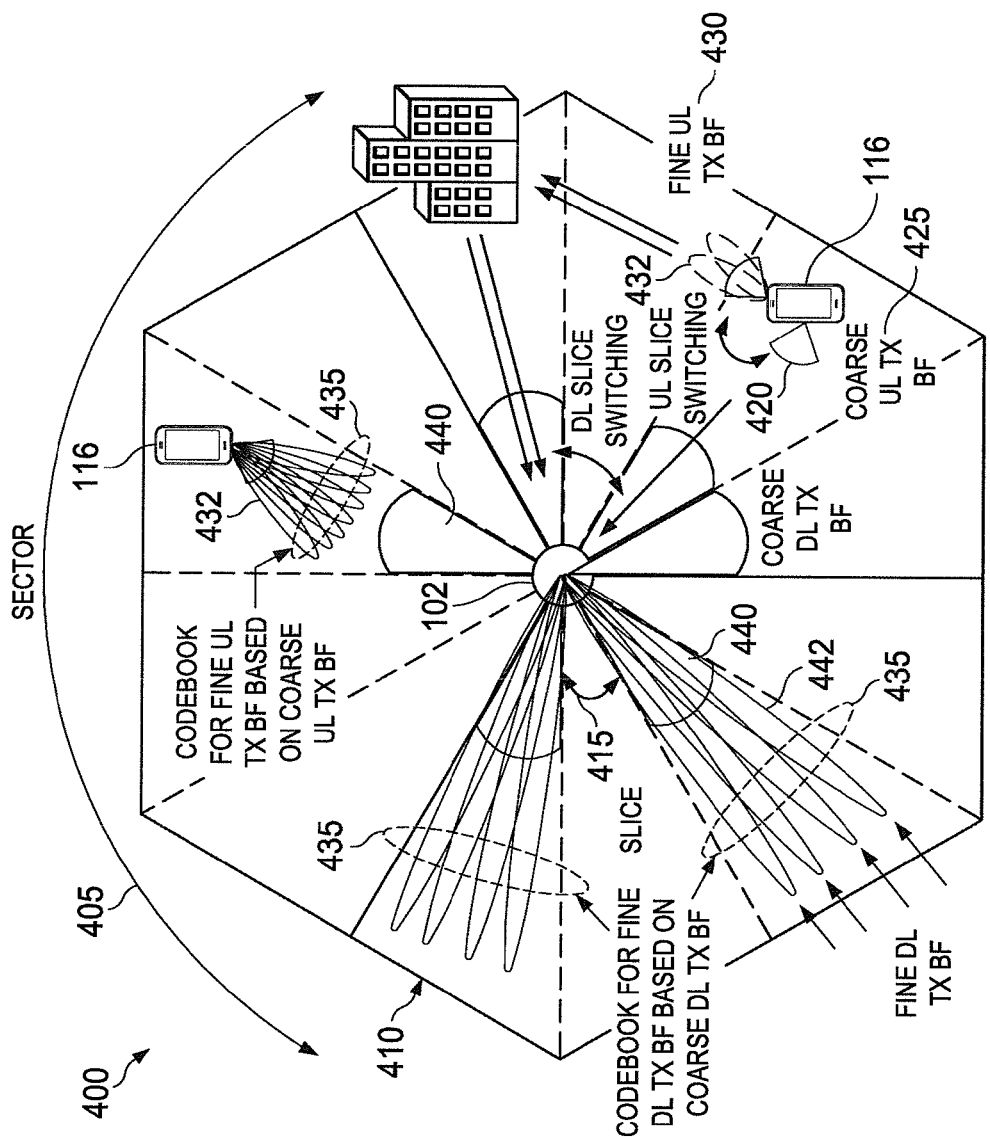
FIG. 4 illustrates a MIMO system with a large number of antennas according to embodiments of the present disclosure.

FIG. 4 illustrates a MIMO system with a large number of antennas according to embodiments of the present disclosure. The embodiment of the MIMO system 400 shown in FIG. 4 is for illustration only. Other embodiments could be used without departing from the scope of this disclosure.

The MIMO system 400 includes a large number of antennas at both the base station 102 and mobile station 116. In the example shown in FIG. 4, there are three sectors 405 in a cell 410, each covering 120° in the azimuth. In addition, each sector 405 includes four downlink (DL) slices 415. A DL slice 415 in the downlink is defined as the coverage area of a set of transmitter spatial processing schemes within a sector. For example, DL slice 415 in the example shown in FIG. 4 covers 30° field of view within a 120° sector 405. Similarly, an uplink (UL) slice 420 (also referenced as a "blade") in the uplink is defined as the spatial field of view in which mobile station 116 can transmit signal towards or receive signal from. For example, UL slice 420 in the uplink can cover 90° field of view for MS 116 that is capable of steering the antenna or beam in arbitrary direction. In a three-dimensional (3-D) channel, the field of view of a DL slice 415 or UL slice 420 can be defined in both azimuth and elevation. For example, a DL slice 415 or UL slice 420 can have a 60° field of view in azimuth and 30° field of view in elevation. BS 102 can have the capability of communicating via multiple slides at the same time. MS 116 can have the capability of communicating via multiple UL slices at the same time. DL slices 415 and UL slices 420 are typically formed via digital or analog or RF beamforming. Additional spatial processing can be performed on signals transmitted or received in a DL slice 415 or UL slice 420. Furthermore, an UL slice 420 can include a number of UL beams 432 within the UL slice 420 and a DL slice 415 can include a number of DL beams 442 within the DL slice 415.

In MIMO systems with large number of antennas, transmitter beamforming (Tx BF) and receiver beamforming (Rx BF) are frequently used to improve desired signal strength and reduce unwanted interference at both downlink and uplink. Both BS 102 and MS 116 can use beamforming with different half-power beam width (HPBW). For example, for MS 116 to transmit a control channel message to BS 102, a coarse Tx BF 425 precoder can be used so that the transmission can cover the whole field of view of an UL slice. If CSI with finer spatial resolution is available, a fine Tx BF 430 precoder with smaller HPBW can be used for increased beamforming gain and reduced interference to other base stations. The capability of forming precoders with different HPBW allows the MIMO system 400 to process the large dimension of spatial channel and adapt the transmission according to the spatial channel, and the CSI available at the transmitter or receiver. Note that the embodiment of MIMO system 400 shown in FIG. 4 is only using Tx BF as an exemplary spatial processing technique to illustrate the idea of hierarchical spatial processing with different resolution or HPBW. More sophisticated spatial processing techniques other than simple Tx BF can also be applied, such as SDMA, and spatial multiplexing, without departing from the coverage of this disclosure.

Coarse Tx BF 425 has many benefits. The coarse Tx BF 425 precoder is easy to acquire with a small amount of reference signal overhead. Coarse Tx BF 425 can be selected to improve performance based on long-term large-scale CSI (such as, Angle of Arrival (AoA), Angle of Departure (AoD), and the like). Once identified, MS 116 can use the coarse Tx BF 425 precoder to communicate to BS 102 for a long period of time since the coverage of a coarse Tx BF 425 precoder is generally wide. It generally takes a long time for MS 116 to move enough distance such that the coarse Tx BF 425 precoder needs to be updated. Due to the large HPBW, coarse Tx BF 425 is generally robust for incomplete or inaccurate CSI. However, also due to the large HPBW, coarse Tx BF 425 has a small Tx BF gain, which means reduced link budget or data rate and increased interference to other users or sectors 405. For such reasons, certain embodiments use coarse Tx BF 425 precoders for uplink control channel transmission, and data channel communication for high mobility users.

Alternatively, fine Tx BF 430 precoders have large Tx BF gain and can thus increase the desired signal strength and reduce interference significantly, which leads to user throughput and system capacity improvement. Fine Tx BF 430 precoders can be selected to further improve the beamforming gain based on more accurate estimation of AoA and AoD, and to improve performance based on short-term small-scale CSI (e.g., frequency selective fast fading). However, sophisticated uplink channel sounding procedures with extensive uplink sounding reference signals overhead are required to acquire the needed channel state information for accurate selection or generation of fine Tx BF 430 precoders. Fine Tx BF 430 precoders are also sensitive to channel estimation error. Because fine Tx BF 425 precoders have small HPBW, communications over these precoders are subject to frequent precoder switching. In some situations, even the short-term small-scale fading (i.e., fast fading) of the channel can cause fine Tx BF 430 precoder to change. For such reasons, certain embodiments use fine Tx BF precoders for data channel communication to low mobility users where closed-loop spatial processing with feedback can be reliably established.

In certain embodiments, multiple levels of coarse and fine precoders for Tx and Rx beamforming exist. Hierarchical channel sounding schemes can be developed to provide CSI to transmitter and receiver to suit the needs of different levels of coarse and fine Tx/Rx beamforming.

With hierarchical channel sounding schemes, the channel state information (CSI) in a large dimensional channel matrix can be acquired and reported via multiple stages with the initial stages focusing on sounding of long-term large-scale CSI and the latter stages focusing on sounding of short-term small-scale CSI. With the long-term and large-scale CSI acquired, coarse Tx and Rx beamforming can be established, which improves the performance of communications for certain channels, such as, uplink control channels. Additionally, the uplink sounding reference signals and the codebook for short-term and small-scale CSI can be dependent on the long-term and large-scale CSI. As shown in the example shown in FIG. 4, different Tx BF codebook for fine Tx BF 435 can be selected based on the coarse Tx BF 440 (or long-term and large-scale CSI).

For simplicity, we illustrate the hierarchical channel sounding use examples with two-stage channel sounding, with the first stage corresponding to coarse Tx Rx 440 beamforming based on long-term and large-scale CSI, and the second stage corresponding to fine Tx Rx 435 beamforming based on short-term and small-scale CSI. In some examples, the coarse Tx 440 beamforming in the uplink is further simplified to selecting a preferred or active UL slice for MS 116.

FIG. 5 illustrates uplink channel sounding for large dimensional MIMO channels according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

A plurality of sounding signals or reference signals can be transmitted to aid the acquisition of uplink CSI in multiple stages. The example shown in FIG. 5 illustrates how uplink CSI can be acquired in the uplink of a MIMO system with a large number of transmitter or receiver antennas.

MS 116 synchronizes with BS 102 in the downlink using downlink sync signals and reference signals, in block 505. In block 505, downlink timing synchronization, and frequency synchronization can be achieved. Some long-term large-scale CSI can be acquired, such as the AoA and AoD of the spatial channel. As a result, some coarse Tx 440 beamforming, such as selection of the preferred DL slice 415 for downlink Tx BF can be established.

In certain embodiments, uplink long-term CSI and preferred uplink spatial processing schemes are inferred from the downlink long-term CSI and preferred downlink spatial processing schemes. This can be the case if channel reciprocity between long-term large-scale CSI in the downlink and the uplink can be assumed. Note that the preferred uplink spatial processing schemes can include the preferred UL slice 420 at MS 116 to transmit in the uplink, and the preferred DL slice 415 at BS 102 to receive in the uplink. This information can be derived from the preferred downlink spatial processing schemes, such as the preferred DL slice 415 at BS 102 to transmit in the downlink, and the preferred UL slice 420 at MS 116 to receive in the downlink. Assuming the transmitter and receiver chains are calibrated at both BS 102 and MS 116, if the preferred downlink Tx precoder at BS 102 is S1, and the downlink Rx precoder at MS 116 is B1, then BS 102 or MS 116 can determine the preferred uplink Tx precoder at MS 116 as B1, and the preferred uplink Rx precoder at BS 102 as S1. Additionally, certain mapping between the downlink precoder and uplink precoder can be established. For example, if the preferred downlink Tx precoder (or DL slice 415) at BS 102 is S1, then the preferred uplink Rx precoder (or DL slice 415) at BS 102 is S1'. If the preferred downlink Rx precoder (or UL slice 420) at MS 116 is B1, then the preferred uplink Tx precoder (or UL slice 420) at MS 116 is B1'. The mapping can be either a transformation (such as a linear transformation defined by a matrix), or a mapping table between the downlink Tx precoders and the uplink Rx precoders at BS 102, or the downlink Rx precoders and the uplink Tx precoders at MS 116.

Once downlink synchronization is achieved, MS 116 acquires the system configuration regarding the random access channel. Then MS 116 attempts to access the system via uplink random access (RACH), in block 510. In block 510, uplink timing synchronization can be acquired. In addition, coarse uplink Tx beamforming and Rx beamforming can be determined.

In block 515, MS 116 transmits uplink coarse sounding reference signal (SRS) to enable tracking of the preferred UL slice for uplink transmissions. This procedure is briefly outlined herein below with reference to FIG. 8. MS 116 can transmit Fine SRS in order to resolve the short-term small-scale CSI in block 520. Accordingly, blocks 505 and 510 generally correspond to long-term large-scale CSI while blocks 515 and 520 generally correspond to actions for short-term small-scale CSI. In the connected state, if MS 116 transmits data or control in the uplink, MS 116 also can transmit associated demodulation reference signals (DMRS) to help base station acquire more accurate uplink CSI for demodulation purpose, as shown in block 525.

Figure 6A:
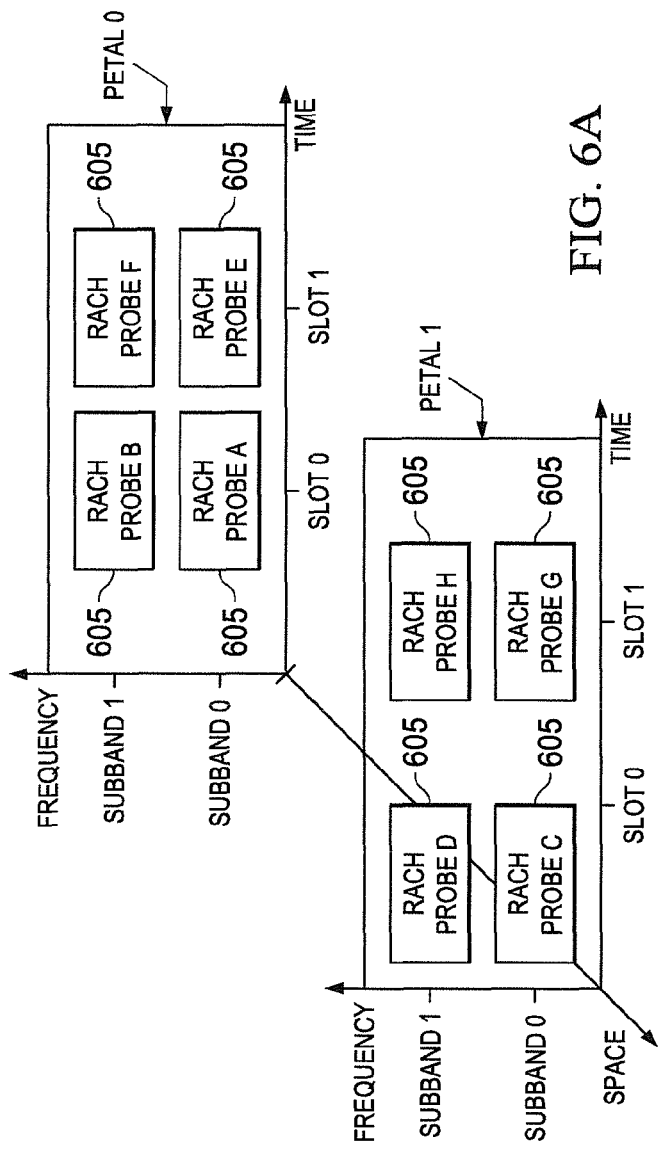
FIGS. 6A and 6B illustrate time-frequency-space multiplexing of uplink random access signals according to embodiments of the present disclosure.
Figure 6B:
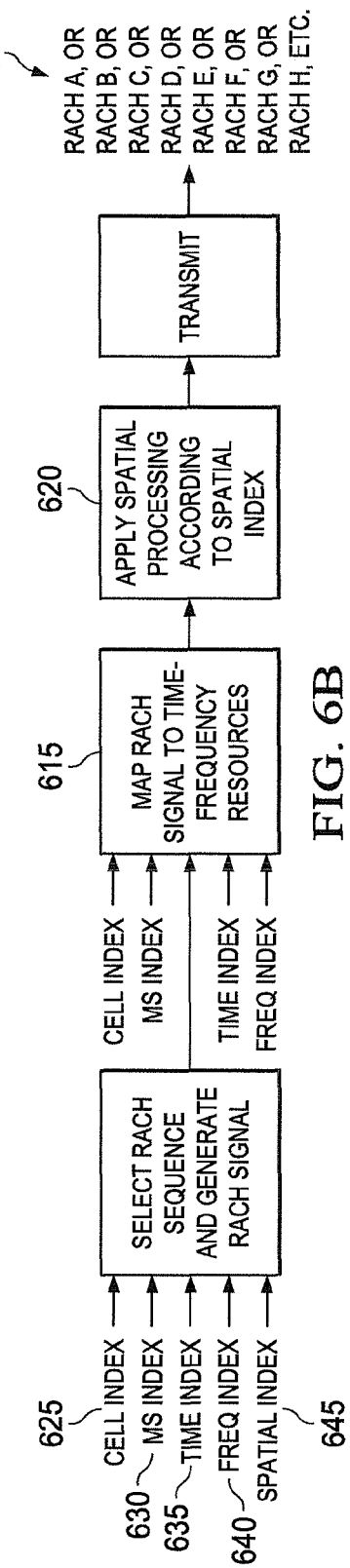

FIGS. 6A and 6B illustrate time-frequency-space multiplexing of uplink random access signals according to embodiments of the present disclosure. The embodiment of the time-frequency-space multiplexing shown in FIGS. 6A and 6B is for illustration only. Other embodiments could be used without departing from the scope of this disclosure.

Once downlink synchronization is achieved, MS 116 acquires the system configuration regarding the random access channel. Then, MS 116 attempts to access the system via uplink random access, as shown in block 510 in FIG. 5. In block 510, uplink timing synchronization can be acquired. In addition, coarse uplink Tx beamforming and Rx beamforming can be determined.

In certain embodiments, MS 116 transmits multiple RACH probes 605 using different uplink Tx beamforming. These RACH probes 605 can be transmitted in different symbols, or different frequencies or resource blocks, or in the same time and frequency resources but with different uplink Tx beamforming to spatially separate them as shown in FIG. 6A. The RACH sequences 610, the time-frequency resources used in RACH transmissions (e.g., the mapping of RACH signal to time frequency resources 615), and the spatial processing 620 applied to the RACH transmissions can be dependent on cell index 625, mobile station index 630, time index 635, frequency index 640, and spatial index 645 (e.g., index of the uplink Tx BF precoder), as shown in FIG. 6B. This will allow the RACH signals from different mobile stations to be sufficiently randomized and easily distinguishable at the base station. In addition, upon detecting a RACH probe 605, BS 102 identifies the information carried on the RACH probe 605 such as MS index 630 or spatial index 645.

FIGS. 7A and 7B illustrate acquiring long-term large-scale spatial CSI information using RACH signals according to embodiments of the present disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain and a receiver chain in, for example, a base station or a mobile station.

BS 102 can attempt detection of these multiple RACH probes. In certain embodiments, upon detection of some of the RACH probes and measuring the signal strength or quality of the detected RACH probes, BS 102 determines which RACH probe associated with a certain uplink Tx spatial processing scheme (e.g., an uplink Tx BF precoder) is preferable. Similarly, BS 102 can attempt detection of uplink RACH probes using different uplink Rx spatial processing. Upon detection of some of the RACH probes and measuring the signal strength or quality of the detected RACH probes, BS 102 determine which RACH probe associated with a pair of certain uplink Tx spatial processing and Rx spatial processing is preferable. Two examples of the procedure for BS 102 to acquire long-term large-scale spatial CSI information using RACH signals are shown FIGS. 7A and 7B. Based on the long-term large-scale spatial CSI, BS 102 indicates the preferred uplink spatial processing as either the paired transmitter and receiver spatial processing, or only the transmitter spatial processing information.

In FIG. 7A, MS 116 transmits RACH signals with multiple TS Beamforming properties in block 705. BS 102 receives the RACH signals with multiple TS Beamforming properties in block 710. In block 715, BS 102 identifies the preferred (Tx BF, Rx BF) pair for MS 116 that transmits RACH and feeds back the preference to MS 116 in block 720.

In FIG. 7B, MS 116 transmits RACH signals with multiple TS Beamforming properties in block 725. BS 102 receives the RACH signals with multiple TS Beamforming properties in block 730. In block 735, BS 102 identifies the preferred uplink Tx BF schemes and feeds back the preference to MS 116 in block 740.

FIG. 8 illustrates a procedure 800 for long-term large-scale CSI tracking and update in the uplink according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain and a receiver chain in, for example, a base station or a mobile station.

Once the RACH procedure is successfully completed, MS 116 enters into connected state with BS 102. In block 805, BS 102 and MS 116 negotiate UL long-term spatial processing scheme/uplink slice switching. In certain embodiments, MS 116 continues to transmit sounding reference signals (SRS) using coarse Tx beamforming to track and update the uplink long-term large-scale CSI when MS 116 is in a certain state (e.g., connected or active state), as shown in block 810. For example, as shown in FIG. 5, in block 515, MS 116 transmits uplink Coarse SRS to enable tracking of the preferred UL slice for uplink transmissions. BS 102 receives the Coarse SRS signals and estimates CSI in block 815. In block 820, a determination is made as to whether a Petal switching criteria is met. If the criteria is met for UL slice switching, e.g., the estimated signal quality of a UL slice 420 exceeding the estimated signal quality of a currently preferred UL slice 420, a UL slice switching procedure can be initiated (either by MS 116 or BS 102) to enable MS 116 to change the preferred UL slice 420 for uplink transmission. This procedure is briefly outlined herein above with reference to FIG. 5.

Figure 9:
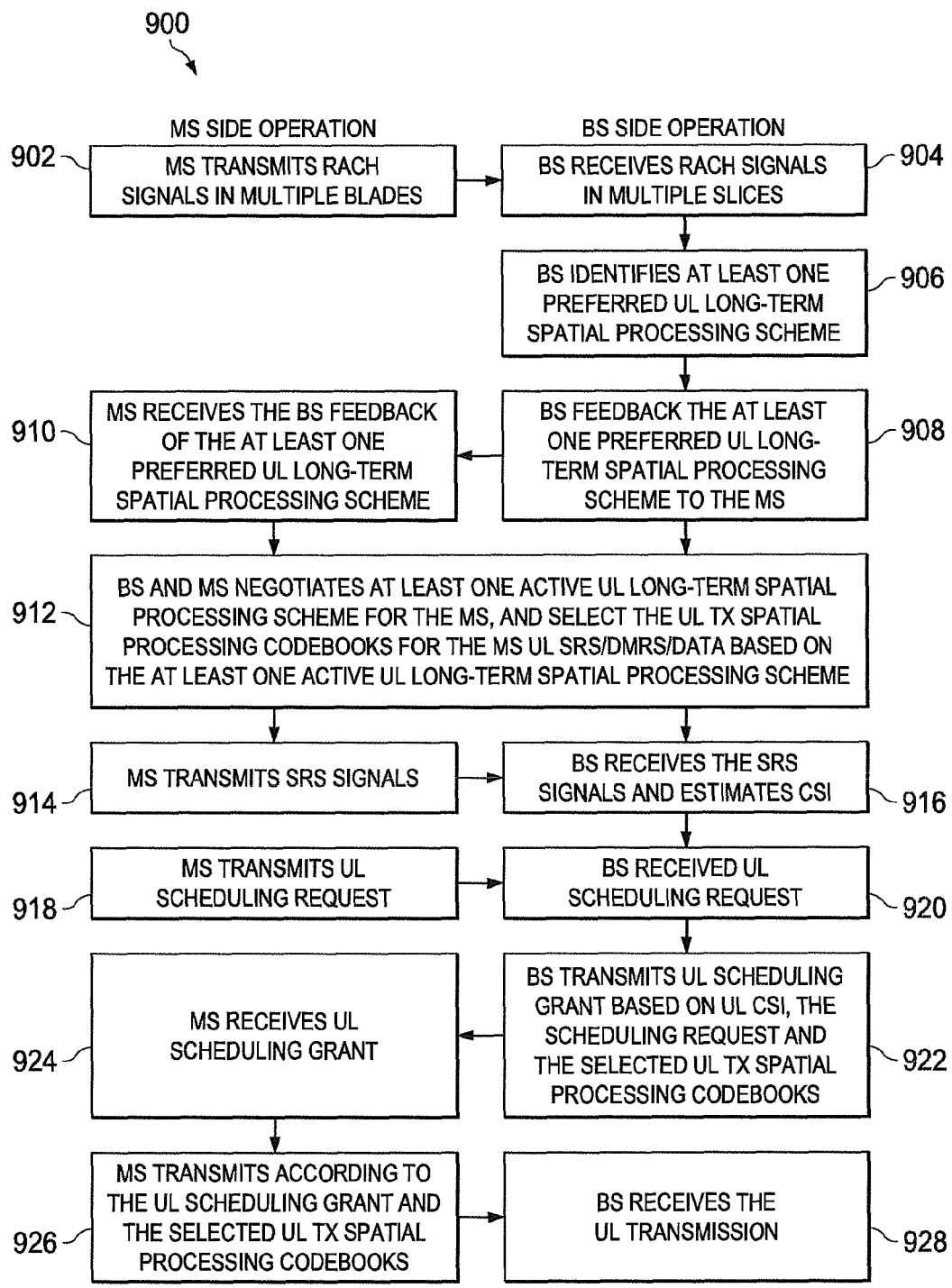
FIG. 9 illustrates hierarchical uplink channel sounding and channel sensitive scheduling 900 according to embodiments of the present disclosure.

FIG. 9 illustrates hierarchical uplink channel sounding and channel sensitive scheduling 900 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain and a receiver chain in, for example, a base station or a mobile station.

The determination of a preferred UL slice 420 (or preferred UL slices 420) for uplink transmission narrows down the field of view for uplink data and control channel transmission, thus allowing more efficient sounding of uplink short-term small-scale channel and more efficient determination of uplink Tx spatial processing for uplink data and control channels. By limiting the uplink fine channel sounding and uplink data transmission to be within (or strongly correlated with) the preferred UL slice 420 (or preferred UL slices), good uplink transmitter beamforming gain can be expected, while the uplink CSI that needs to be resolved by fine channel sounding and estimation is reduced. MS 116 can transmit Fine SRS in order to resolve the short-term small-scale CSI. One example is shown as Block 520 discussed herein above with respect to FIG. 5. Assuming one or few UL slices 420 are selected as preferred UL slices 420 for uplink transmission, MS 116 only needs to perform fine SRS within (or strongly correlated with) the one or few UL slices 420, thus reducing the overhead of fine uplink SRS.

In certain embodiments, MS 116 transmits fine SRS using a first set of uplink Tx beamformers for a first set of preferred coarse beamformers, and MS 116 transmits fine SRS using a second set of uplink Tx beamformers for a second set of preferred coarse beamformers. In other words, the fine SRS for the purpose of sounding short-term small-scale spatial CSI depends on the coarse beamforming or long-term large-scale spatial CSI. By doing so, the range is effectively narrowed down and the overhead of fine SRS is reduced based on the long-term large-scale spatial CSI acquired in earlier stages (e.g., through RACH or coarse SRS). FIG. 9 illustrates an exemplary procedure 900 for BS 102 and MS 116 to acquire long-term large-scale CSI (as shown in blocks 902, 904, 906, 908, 910, and 912), and to acquire short-term small-scale CSI based on the long-term large-scale CSI (as shown in blocks 914 and 916), and to perform uplink data channel scheduling request/grant and transmission according to the estimated short-term small-scale CSI (as shown in blocks 918, 920, 922, and 924). Based on the long-term large-scale CSI acquired in blocks 902-912, a first uplink spatial processing scheme (e.g., a coarse Tx BF scheme) can be selected for transmitting a first uplink control channel. At the same time, a first codebook can be selected for transmitting an uplink sounding signal (e.g., fine SRS) based on the long-term large-scale CSI, or based on the said first uplink spatial processing scheme selected for transmitting the first uplink control channel. Time frequency-resource also can be allocated for MS 116 to transmit the uplink sounding signal. The allocation of the time-frequency resources also can be dependent on the long-term large-scale CSI or the first uplink spatial processing scheme selected for transmitting the first uplink control channel. When MS 116 transmits an instance of the uplink sounding signal, MS 116 selects one precoder from the first codebook, and applies uplink spatial processing according to the one precoder to transmit the instance of the uplink sounding signal.

FIG. 10 illustrates a hierarchical uplink channel sounding and channel sensitive scheduling with mobility event 1000 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain and a receiver chain in, for example, a base station or a mobile station.

Triggers for mobility event also can be part of the process during the uplink SRS transmission and CSI estimation. In certain embodiments, MS 116 transmits a first sounding signal (e.g., Coarse SRS) and a second sounding signal (e.g., Fine SRS). A mobility event (e.g., UL slice switching) can be derived by BS 102 monitoring, among others, the first sounding signal and deriving at least one metric. If the at least one metric meets certain triggering condition, the mobility event can be triggered. Upon the triggering of the mobility event, BS 102 can request MS 116 to perform certain tasks, such as updating its active or preferred UL slice list, and change the configuration of sounding signals. Preferably, at least one configuration of the first sounding signal (e.g., the codebook for the Tx precoders for the first sounding signal) remains the same so that the continuous monitoring of mobility event is not interrupted, while at least a second configuration of the second sounding signal (e.g., the codebook for the Tx precoders for the second sounding signal) is changed upon the mobility event. In the example shown in FIG. 10, BS 102 and MS 116 acquire long-term large-scale CSI and negotiate the configuration for the first sounding signal (e.g., Coarse SRS) in block 1005. In order to monitor and detect certain mobility events such as UL slice switching, MS 116 transmits Coarse SRS, in block 1010. BS 102 receives the Coarse SRS in block 1015. If the mobility event (e.g., UL slice switching or update) triggering conditions are met in block 1020, the mobility event is triggered. Upon the mobility event, the Fine SRS is reconfigured in block 1025. MS 116 transmits the Fine SRS according to the new configuration, in block 1030, and BS 102 receives the Fine SRS according to the new configuration in block 1035. BS 102 and MS 116 perform uplink data channel scheduling request/grant and transmission according to the estimated short-term small-scale CSI from the Fine SRS in block 1040.

In the connected state, if MS 116 transmits data or control in the uplink, MS 116 can also transmit associated demodulation reference signals (DMRS) to help BS 102 acquire more accurate uplink CSI for demodulation purpose, as shown in block 525 discussed herein above with respect to FIG. 5. In certain embodiments, BS 102 explicitly indicates the spatial processing/beamforming for the uplink DMRS in a scheduling grant. The indication can be the index of a beamformer within a beamforming codebook. The beamforming codebook can be selected or constructed based on the long-term CSI (e.g., estimated via RACH or uplink Coarse SRS), while the beamformer index is derived based on the fine level or short-term CSI (e.g., estimated via uplink Fine SRS).

Figure 11:
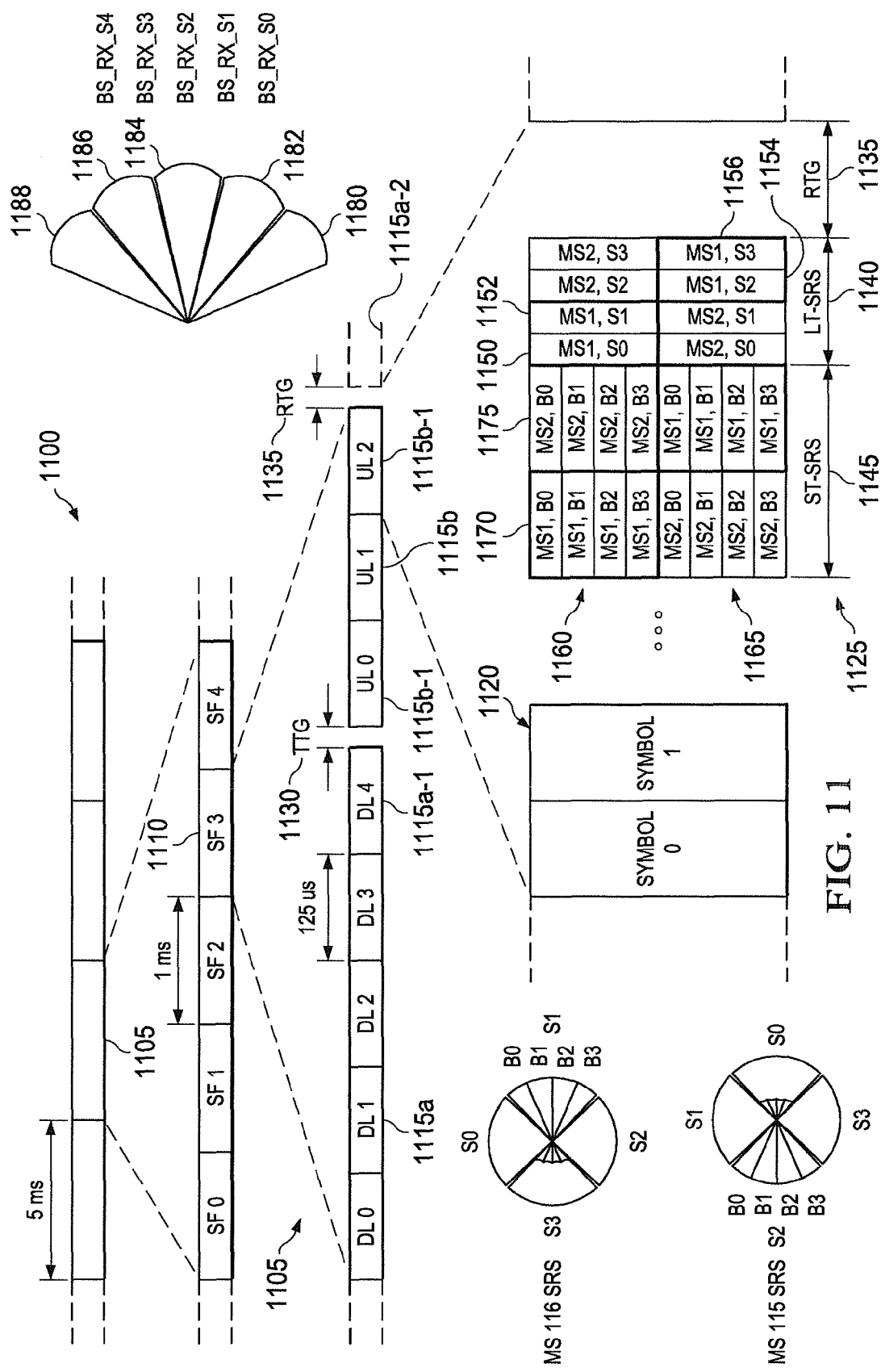
FIG. 11 illustrates Uplink Long Term-Sounding Reference Signal (LT-SRS) and Short Term-Sounding Reference Signal (ST-SRS) according to embodiments of the present disclosure.

FIG. 11 illustrates Uplink Long Term-Sounding Reference Signal (LT-SRS) and Short Term-Sounding Reference Signal (ST-SRS) according to embodiments of the present disclosure. The embodiment of the LT-SRS and ST-SRS shown in FIG. 11 is for illustration only. Other embodiments could be used without departing from the scope of this disclosure.

In the frame structure 1100 includes a plurality of frames 1105, which are five milliseconds (ms) in duration. In each frame 1105, there are five subframes 1110, which are 1 ms in duration (shown as SF 0, SF 1, SF 2, SF 3, and SF 4). Each subframe consists of eight slots 1115, which are 125 microseconds (µs) in duration, with five out of the eight slots 1115 being downlink slots 1115a (shown as DL 0, DL 1, DL 2, DL 3, and DL 4) and the rest being uplink slots 1115b (shown as UL 0, UL 1, and UL 2). Each slot 1115 includes a plurality of Orthogonal Frequency Division Multiplexing (OFDM) symbols, or Single Carrier-Frequency Division Multiple Access (SC-FDMA) symbols, 1120.

In certain embodiments, BS 102 allocates a first set of time and frequency resources for a first type of uplink sounding reference signals (SRS) and a second set of time and frequency resources for a second type of uplink sounding reference signals. For example, the first type of uplink SRS can be uplink long-term SRS (LT-SRS), and the second type of uplink SRS can be uplink short-term SRS (ST-SRS).

The primary function of the LT-SRS is to sound the long-term channel characteristics such as Angle of Departure (AoD), Angle of Arrival (AoA), and the relative strength of each path. A path, for example, can be defined by an (AoD, AoA) pair. MS 116 can have multiple uplink slices 420, the combination of which preferably covers most (if not all) of the possible directions that MS 116 can transmit. Likewise, the codebook for the LT-SRS can cover all the possible directions that MS 116 can transmit. For the purpose of illustration, a one-to-one mapping between the LT-SRS precoders and the uplink slices is illustrated in the examples. Although it is certainly possible to design the codebook for LT-SRS differently from the uplink slices 420 without departing from the scope of this disclosure.

Because the primary purpose of LT-SRS is to sound the long-term channel characteristics, in certain embodiments, the time and frequency density of the LT-SRS is low to reduce the overhead of the system. Alternatively, in certain embodiments, the density of the LT-SRS is enough to complete the scanning of the MS 116 uplink transmitter slices and the BS 102 uplink receiver slices within reasonable amount of time. To further reduce the time needed for transmitter and receiver slice scanning, shortened OFDM symbols can be used for LT-SRS (or ST-SRS as well).

The primary function of the ST-SRS is to sound the short-term time-domain fast fading and frequency selective fading. Once the active uplink transmitter slices are determined (e.g., BS 102 detecting the strongest uplink transmitter slices), the codebook for the ST-SRS precoders should primarily focus on sounding the channel within the spatial domain defined by the active uplink transmitter slices. This will allow higher time and frequency domain density of the ST-SRS, while maintaining a reasonable level of overhead for the ST-SRS.

One example of uplink SRS transmission and reception is shown in FIG. 11. In this example, separate time and frequency resources 1125 are allocated for long-term SRS 1140 and short-term SRS 1145. Between the last downlink slot in a subframe (DL 4 1115a-1) and the first uplink slot in the subframe (UL 0 1115b-1), there is a Transmit/Receive Transition Gap (TTG) 1130. Between the last uplink slot in a subframe (UL 2 1115b-2), and the first downlink slot in the next subframe (DL 0) 1115a-2, there is a Receive/Transmit Transition Gap (RTG) 1135.

For both LT-SRS 1140 and ST-SRS 1145, transmission opportunities are allocated in each subframe 1105. Mobile stations transmit LT-SRS 1140 in the (OFDMA or SC-FDMA) symbols 1120 right before the RTG 1135, and transmit ST-SRS 1145 in the (OFDMA or SC-FDMA) symbols 1120 right before the LT-SRS 1140.

Long-Term SRS (LT-SRS)

The long-term SRS 1140 signals can be transmitted via multiple spatial processors in different time-frequency transmission opportunities. The primary purpose of the LT-SRS 1140 is to capture the long-term channel characteristics, e.g., long-term wideband Channel Quality Indicator (CQI), long-term spatial channel characteristics, and the like. In the example shown in FIG. 11, MS 116 transmits LT-SRS 1140 via its mobile station slice S0, S1, S2, and S3. MS 115 also transmits LT-SRS 1140 via its mobile station slice S0, S1, S2, and S3. Note that the mobile station slices are defined on a per mobile station basis. Therefore, the mobile station slice S0 for MS 116 can be different from the mobile station slice S0 for MS 115. Of course, a mobile station can use other spatial processors instead of mobile station slices without departing from the scope of this disclosure. In certain embodiments, the spatial processors collectively provide sufficient coverage in sounding the spatial directions at the transmitter along which a link could be established.

In certain embodiments, the transmissions of LT-SRS 1140 with different spatial processors by the same MS, such as MS 116, can be multiplexed in time in different symbols. In the example shown in FIG. 11, MS 116 transmits LT-SRS 1140 via S0 in the first LT-SRS symbol 1150, via S1 in the second LT-SRS symbol 1152, via S2 in the third LT-SRS symbol 1154, and via S3 in the fourth LT-SRS symbol 1456 (shown as "MS1, S0", "MS1, S1", "MS1 S2", "MS1, S3", respectively).

In certain embodiments, the transmissions of LT-SRS 1140 with different spatial processors by the same MS, such as MS 116, can also be multiplexed in frequency in the same symbol, if MS 116 has the capability to transmit LT-SRS 1140 using multiple spatial processors at the same time.

In certain embodiments, the transmissions of LT-SRS 1140 by different MSs, such as MS 111-MS 116, can also be multiplexed in time or frequency. In the example shown in FIG. 11, MS 116 transmits LT-SRS via S0 in the first sub-band 1160 in the first LT-SRS symbol 1150, while MS 115 transmits LT-SRS via its own S0 in the second sub-band 1165 in the first LT-SRS symbol 1150.

In certain embodiments, in order to provide sufficient sampling of the system bandwidth, LT-SRS 1140 can also be transmitted in different frequency resources in different symbols. In the example shown in FIG. 11, MS 116 transmits LT-SRS 1140 via S0 in the first sub-band 1160 in the first LT-SRS symbol 1150, transmits LT-SRS 1140 via S1 in the first sub-band 1160 in the second LT-SRS symbol 1152, transmits LT-SRS 1140 via S2 in the second sub-band 1165 in the third LT-SRS symbol 1154, and transmits LT-SRS 1140 via S3 in the second sub-band 1165 in the fourth LT-SRS symbol 1156.

In certain embodiments, the transmissions of LT-SRS 1140 with different spatial processors by the same MS, such as MS 116, can also be multiplexed in space, if MS 116 has the capability to transmit LT-SRS 1140 using multiple spatial processors at the same time.

Short-Term SRS (ST-SRS)

The short-term SRS 1145 signals can also be transmitted via multiple spatial processors in different time-frequency transmission opportunities. The primary purpose of the ST-SRS 1145 is to capture the short-term channel characteristics, including short-term frequency selective CQI, short-term spatial channel characteristics, and the like. In the example shown in FIG. 11, MS 116 transmits ST-SRS 1145 via beam B0, B1, B2, and B3. MS 115 transmits ST-SRS 1145 via beam B0, B1, B2, and B3. Note that the uplink transmitter beams are defined on a per mobile station basis. Therefore, the beam B0 at MS 116 can be different from the beam B0 at MS 115. Of course, a mobile station can use other spatial processors instead of beams without departing from the scope of this disclosure.

In certain embodiments, in order to limit the overhead for ST-SRS 1145, ST-SRS 1145 is only transmitted in a spatial subspace of all the spatial directions along which a link could likely be established. In certain embodiments, the choice if the spatial subspace is dependent on the long-term spatial channel characteristics, among other things. As shown in FIG. 11, MS 116 transmits ST-SRS 1145 via B0, B1, B2, and B3, which collectively provide sufficient coverage in sounding the spatial directions within slice S1 at MS 116. MS 115 transmits ST-SRS via its own B0, B1, B2, and B3, which collectively provide sufficient coverage in sounding the spatial directions within slice S2 at MS 115.

In certain embodiments, the transmissions of ST-SRS 1145 with different spatial processors by the same MS, such as MS 116, can be multiplexed in time or frequency. In the example shown in FIG. 11, MS 116 transmits ST-SRS 1145 via B0, B1, B2, and B3 in the first ST-SRS symbol 1170 (shown as "MS1, B0", "MS1, B1", "MS1 B2", "MS1, B3"). These transmissions are multiplexed in different frequency subcarriers.

In certain embodiments, the transmissions of ST-SRS by different MSs, such as MS 111-MS 115, can also be multiplexed in time or frequency. In the example shown in FIG. 11, MS 116 transmits ST-SRS 1145 via B0, B1, B2, and B3 in the first sub-band 1160 in the first ST-SRS symbol 1170, while MS 115 transmits ST-SRS 1145 via its own B0, B1, B2, and B3 in the second sub-band 1165 in the first ST-SRS symbol 1170.

In certain embodiments, in order to also capture frequency selective channel information, ST-SRS 1145 can also be transmitted in different frequency resources in different symbols. In the example shown in FIG. 11, MS 116 transmits ST-SRS 1145 via B0, B1, B2, and B3 in the first sub-band 1160 in the first ST-SRS symbol 1170, and transmits ST-SRS 1145 via B0, B1, B2, and B3 in the second sub-band 1165 in the second ST-SRS symbol 1175.

In certain embodiments, the transmissions of ST-SRS 1145 with different spatial processors by the same MS, such as MS 116, can also be multiplexed in space, if MS 116 has the capability to transmit ST-SRS using multiple spatial processors at the same time.

LT-SRS and ST-SRS Symbols

In certain embodiments, the symbol duration for ST-SRS symbols 1170, 1175 and LT-SRS symbols 1150, 1152, 1154, 1156 can be different. In the example shown in FIG. 11, the ST-SRS symbols 1170, 1175 are four times longer than the LT-SRS symbols 1150, 1152, 1154, 1156. An advantageous aspect of this design is increasing the time domain multiplexing capability of LT-SRS symbols 1150, 1152, 1154, 1156. Additionally, the cyclic prefix length for ST-SRS symbols 1170, 1175 and LT-SRS symbols 1150, 1152, 1154, 1156 can be different. In certain embodiments, the LT-SRS symbols 1150, 1152, 1154, 1156 have longer cyclic prefix to accommodate the possibly longer delay spread that LT-SRS 1140 transmissions can experience due to the wider beamwidth of the spatial processors used in transmitting LT-SRS 1140 signals than that of the spatial processors used in transmitting ST-SRS 1145 signals.

Base Station Reception of LT-SRS and ST-SRS Signals

In certain embodiments, BS 102 receives uplink SRS signals, including LT-SRS 1140 and ST-SRS 1145, using different spatial processors in different subframes 1105, slots 1115, or symbols 1120. The different spatial processors include, but are not limited to, different RF beamforming configurations for receiving LT-SRS 1140 and ST-SRS 1145 in different subframes 1105, slots 1115, or symbols 1120. BS 102 can use a first spatial processor to receive a first SRS signal in a first SRS symbol, and use a second spatial processor that may be different from the first spatial processor to receive a second SRS signal in a second SRS symbol.

In the example shown in FIG. 11, BS 102 can receive LT-SRS 1140 signals via slice BS_Rx_S0 1180 in subframe SF 0, via slice BS_Rx_S1 1182 in subframe SF 1, via slice BS_Rx_S2 1184 in subframe SF 2, via slice BS_Rx_S3 1186 in subframe SF 3, and via slice BS_Rx_S4 1188 in subframe SF 4.

Similar schemes can be used to receive ST-SRS 1145 signals. That is, BS 102 can receive ST-SRS 1145 signals via slice BS_Rx_S0 1180 in subframe SF 0, via slice BS_Rx_S1 1182 in subframe SF 1, via slice BS_Rx_S2 1184 in subframe SF 2, via slice BS_Rx_S3 1186 in subframe SF 3, and via slice BS_Rx_S4 1188 in subframe SF 4.

In certain embodiments, the spatial processor that BS 102 uses to receive ST-SRS 1145 signals can be adapted according to the characteristics of the uplink channel from the mobile stations that transmit the ST-SRS 1145 signals. In general, BS 102 can use the most preferred base station receiver slices for MS 116 to receive the ST-SRS 1145 signal from MS 116. In order for BS 102 to receive uplink SRS signals in a slice, BS 102 forms a receiver beam that has the same or similar spatial angle (or spatial field of view) as the slice. Of course, BS 102 can use other spatial processors instead of base station slices without departing from the scope of this disclosure. Preferably, the spatial processors should collectively provide sufficient coverage of the field of view of a base station (or a sector), or the spatial directions at the base station (or the sector) along which a link could be established.

SRS Multiplexing

Figure 12:
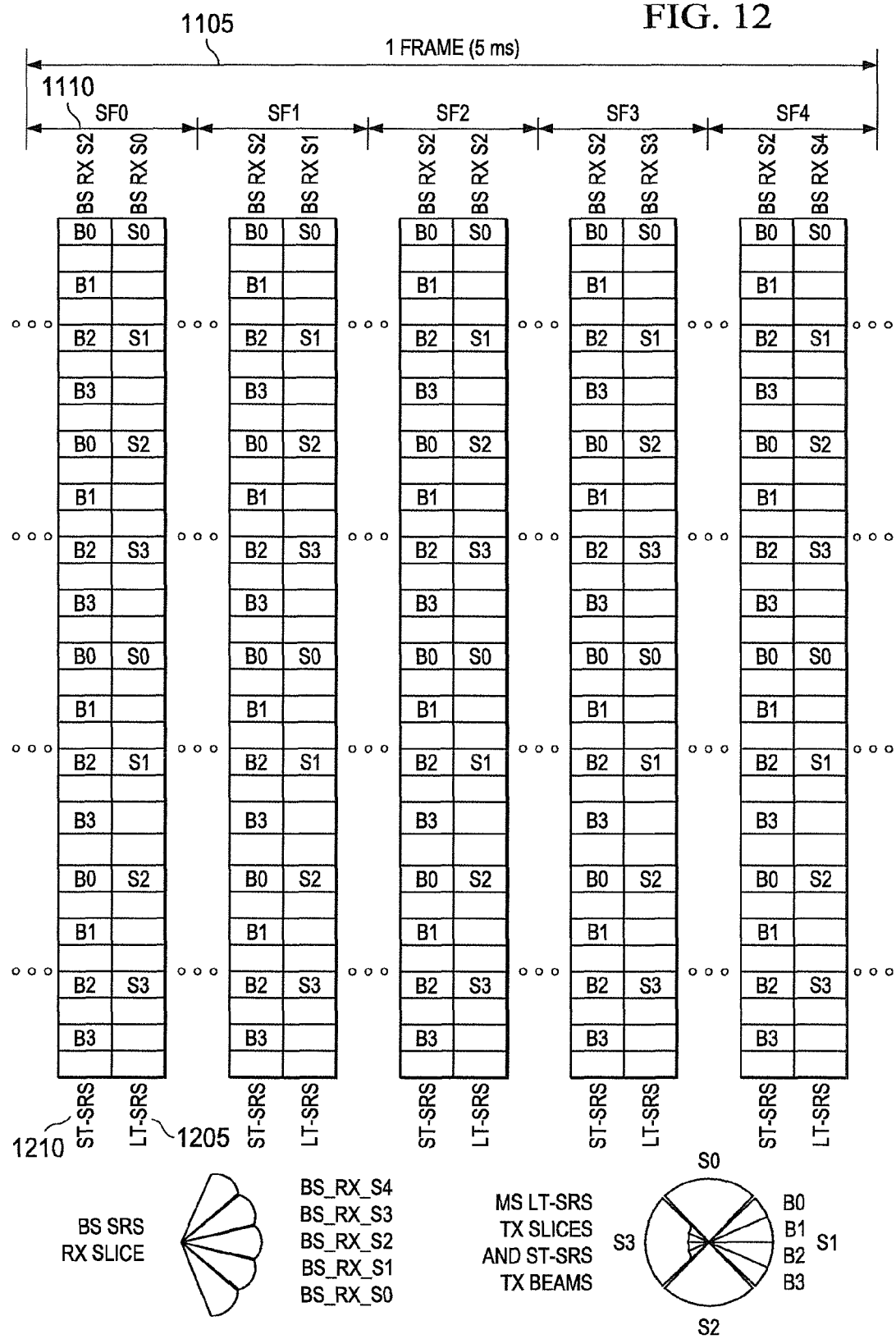
FIG. 12 illustrates time-domain multiplexing of LT-SRS and ST-SRS according to embodiments of the present disclosure.

FIG. 12 illustrates time-domain multiplexing of LT-SRS and ST-SRS according to embodiments of the present disclosure. The embodiment of the time-domain multiplexing of LT-SRS and ST-SRS shown in FIG. 12 is for illustration only. Other embodiments could be used without departing from the scope of this disclosure.

LT-SRS and ST-SRS can be multiplexed in time and frequency.

In the example shown in FIG. 12, in each frame 1105 (5 ms), there are 5 subframes 1110 (shown as SF 0, SF 1, SF 2, SF 3, and SF 4). There is one LT-SRS symbol 1205 and one ST-SRS symbol 1210 in every subframe 1110 (1 ms). For a Time Division Duplexing (TDD) system, the LT-SRS 1140 and ST-SRS 1145 signals should be transmitted in the uplink slots 1115*b* within each subframe 1110. For a Frequency Division Duplexing (FDD) system, the LT-SRS 1140 and ST-SRS 1145 signals should be transmitted in the uplink frequency band.

As in the previous example shown in FIG. 11, BS 102 receives LT-SRS 1140 signals via slice BS_Rx_S0 1180 in subframe SF 0, via slice BS_Rx_S1 1182 in subframe SF 1, via slice BS_Rx_S2 1184 in subframe SF 2, via slice BS_Rx_S3 1186 in subframe SF 3, and via slice BS_Rx_S4 1188 in subframe SF 4. In order for BS 102 to receive LT-SRS 1140 signals in a slice, BS 102 can form a receiver beam that has the same or similar spatial angle (or spatial field of view) as the slice. Of course, BS 102 can use other spatial processors instead of base station slices without departing from the scope of this disclosure. In certain embodiments, the spatial processors collectively provide sufficient coverage of the field of view of a base station (or a sector), or the spatial directions at the base station (or the sector) along which a link could be established.

Since the main function of ST-SRS 1145 transmitted by MS 116 is to sound the short-term fast fading of the channel from the MS 116, the BS 102 receiver can limit its receiver side spatial channel sounding to be within the most preferred slices of MS 116. In the example shown in FIG. 12, BS 102 can receive ST-SRS signals via slice BS_Rx_S2 1184 in all of the five ST-SRS symbols 1210 shown in FIG. 12. This can be advantageous if BS_Rx_S2 1184 is one of the preferred base station receiver slices for all of the mobile stations transmit ST-SRS 1145 signals in the ST-SRS symbol 1210.

In the example shown in FIG. 12, MS 116 transmits ST-SRS 1145 signals in every ST-SRS symbols 1210, and transmits LT-SRS 1140 signals in every LT-SRS symbols 1205. However, in general this needs not to be the case as it is certainly possible that MS 116 only transmits ST-SRS 1145 signals in a subset of the ST-SRS 1210 symbols, and only transmits LT-SRS 1140 signals in a subset of the LT-SRS symbols 1205. For periodic LT-SRS 1140 and periodic ST-SRS 1145, the periodicity of the LT-SRS 1140 and the periodicity of the ST-SRS 1145 are not necessarily the same. As a result, BS 102 can configure both LT-SRS 1140 and ST-SRS 1145 in some slots 1115, but may only configure either LT-SRS 1140 or ST-SRS 1145 in some other slots 1115.

If supported by the mobile station transceiver, MS 116 can transmit LT-SRS 1140 signals in multiple mobile station transmitter slices in the same LT-SRS symbol 1205. One example is shown in FIG. 12. MS 116 transmits LT-SRS 1140 signals in slice S0, S1, S2, and S3 in each of the five LT-SRS symbols 1205. In the same LT-SRS symbol 1205, the LT-SRS 1140 signals in different slices are multiplexed in frequency. The LT-SRS 1140 signals from one mobile station (e.g., MS 116) can be further multiplexed with the LT-SRS 1140 signals from other mobile stations (e.g., one or more of MS 111-MS 115) in different frequencies or in different symbols.

Similarly, if supported by the mobile station transceiver, MS 116 transmits ST-SRS 1145 signals in multiple mobile station transmitter beams in the same ST-SRS symbols 1210. One example is shown in FIG. 14. MS 116 transmits ST-SRS signals in beam B0, B1, B2, and B3 in each of the five ST-SRS symbols 1210. In the same ST-SRS symbol 1210, the ST-SRS 1145 signals in different beams are multiplexed in frequency. The ST-SRS 1145 signals from one mobile station (e.g., MS 116) can be further multiplexed with the ST-SRS signals from other mobile stations (e.g., one or more of MS 111-MS 115) in different frequencies or in different symbols.

SRS Configuration

In certain embodiments, in configuring the transmission of LT-SRS 1140 and ST-SRS 1145 for MS 116, BS 102 transmits at least one SRS configuration message to MS 116. The at least one SRS configuration message can include configuration information such as the time frequency resource allocation for LT-SRS 1140 and ST-SRS 1145, the codebook (or set of spatial processors) for LT-SRS 1140, and the codebook (or set of spatial processors) for ST-SRS 1145, and the mapping from the spatial processors to the time-frequency resource allocation. If the transmission of LT-SRS 1140 (or ST-SRS 1145) is periodic, the timing of LT-SRS 1140 (or ST-SRS 1145) transmission can be indicated by a timing offset (i.e., starting point) and a periodicity. Additionally, the periodicity of the LT-SRS 1140 and the ST-SRS 1145 does not need to be the same. The frequency allocation of LT-SRS 1140 (or ST-SRS 1145) can be either explicitly indicated or derived from certain hopping pattern. The mapping of the multiple slices or beams onto the LT-SRS 1140 or ST-SRS 1145 time-frequency resources can also be indicated explicitly in the message, or implicitly derived from other configurations, or predefined such that BS 102 and MS 116 share the common knowledge about the LT-SRS and ST-SRS pattern in time, frequency, and space.

In certain embodiments, the LT-SRS 1140 and ST-SRS 1145 are flexibly configured on per slice, per beam, or per spatial processor basis. For at least one slice (or beam, or spatial processor) via which the LT-SRS 1140 (or ST-SRS 1145) signal is transmitted, the SRS configuration message can include configuration information such as the time frequency resource allocation, transmission power level, and the like. The amount of time frequency resources allocated to different slices (or beams, or spatial processors) can be different. For MS 116 in the example shown in FIG. 11, if the link quality via slice S0 is much better than the link quality via slice S3, BS 102 can select to measure the transmission from MS 116 slice S0 more closely than that from mobile station slice S3. As a result, more time-frequency resources can be allocated for the LT-SRS 1140 transmission via mobile station slice S0 than the time-frequency resources allocated for LT-SRS 1140 transmission via mobile station slice S3. Some slices (or beams, or spatial processors) can be skipped entirely. For MS 116 in the example shown in FIG. 11, since the ST-SRS 1145 transmissions on B0, B1, B2, and B3 already provide sufficient coverage of the spatial directions within slice S1, MS 116 can skip the transmission of LT-SRS 1140 in slice S1 to further reduce overhead. This can also be configured by base station in the SRS configuration message.

Figure 13A:
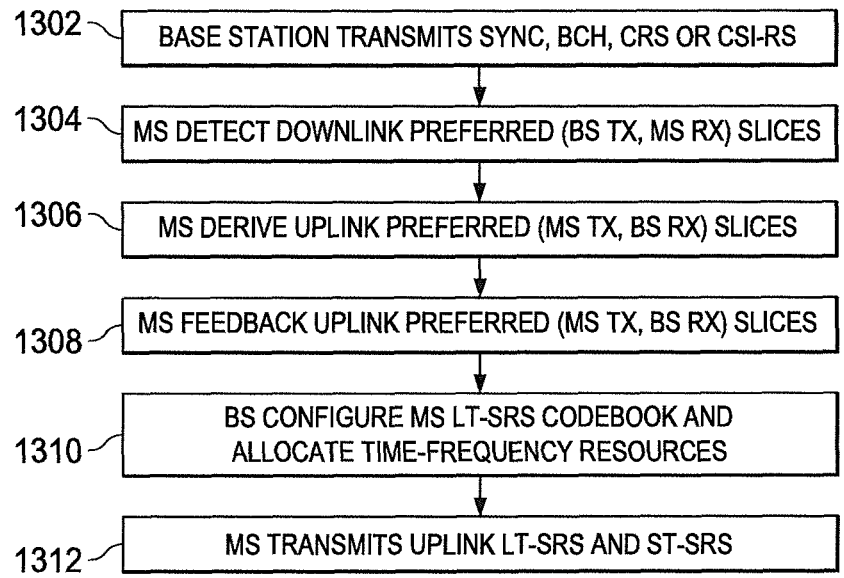
FIGS. 13A, 13B and 13C illustrate processes for SRS configuration according to embodiments of the present disclosure.
Figure 13B:
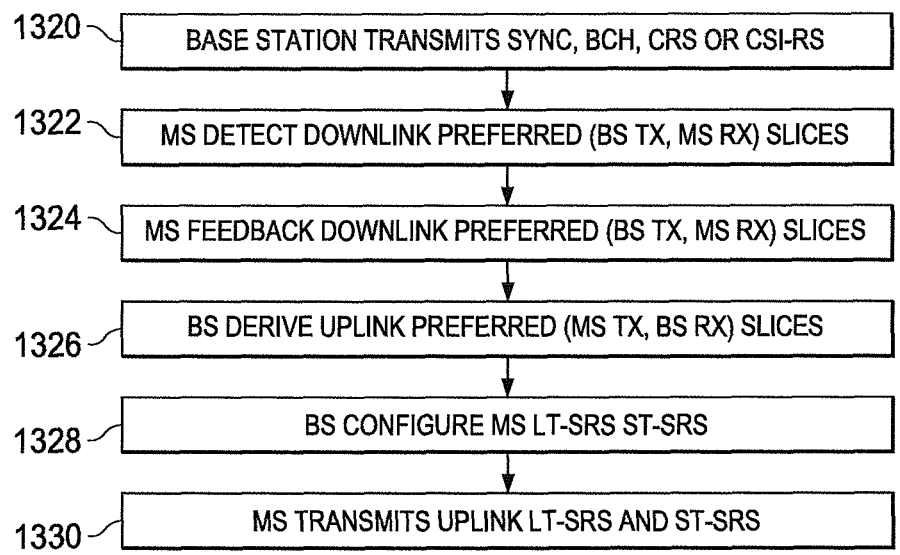
Figure 13C:
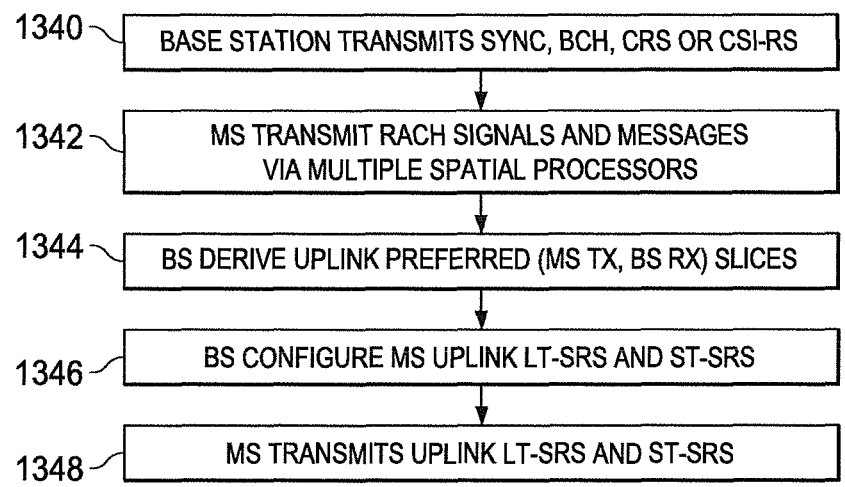

FIGS. 13A, 13B and 13C illustrate processes for SRS configuration according to embodiments of the present disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the example depicted are implemented by a transmitter chain or a receiver chain in, for example, a base station or a mobile station.

A few methods for SRS configuration are shown in FIGS. 13A, 13B and 13C. In order for BS 102 to properly configure the SRS for MS 116, BS 102 needs knowledge about uplink spatial channel characteristics, among other things, of MS 116. In the examples shown in FIGS. 13A, 13B and 13C, the uplink spatial channel characteristics are represented by the preferred uplink (MS Tx, BS Rx) slices. This information can be made available at the base station using different methods.

In certain embodiments, as shown in FIG. 13A, BS 102 transmits Synchronization (Sync), Broadcast Channel (BCH), Common Reference Signal (CRS) or Channel State Information-Reference Signal (CSI-RS) in block 1302. MS 116 detects the downlink preferred (BS Tx, MS Rx) slices in block 1304 and derives the uplink preferred (MS Tx, BS Rx) slices in block 1306. MS 116 feeds back the uplink preferred (MS Tx, BS Rx) slices in block 1308. In block 1310, BS 102 configures MS LT-SRS codebook and allocates time-frequency resources. BS 102 communicates the MS LT-SRS codebook and time-frequency allocation to MS 116. In response, MS 116 transmits uplink LT-SRS and ST-SRS in block 1312. This is a viable and effective approach if downlink-uplink channel reciprocity can be achieved. Downlink-uplink channel reciprocity can be achieved if, for example, there is significant correlation between the downlink and uplink long-term channel characteristics, and the uplink and downlink transceivers at both the base station and the mobile station can be calibrated.

In certain embodiments, the translation from the downlink preferred (BS Tx, MS Rx) slices to uplink preferred (MS Tx, BS Rx) slices can be done by base station also. One example is shown in FIG. 13B, BS 102 transmits Synchronization (Sync), Broadcast Channel (BCH), Common Reference Signal (CRS) or Channel State Information-Reference Signal (CSI-RS) in block 1320. MS 116 detects the downlink preferred (BS Tx, MS Rx) slices in block 1322. MS 116 feeds back the preferred downlink (BS Tx, MS Rx) slices to BS 102 in block 1324. BS 102 derives the preferred uplink (MS Tx, BS Rx) slices assuming channel reciprocity in block 1326. In block 1328, BS 102 configures MS LT-SRS codebook and allocates time-frequency resources. BS 102 communicates the MS LT-SRS codebook and time-frequency allocation to MS 116. In response, MS 116 transmits uplink LT-SRS and ST-SRS in block 1330.

In certain embodiments, as shown in FIG. 13C, MS 116 can transmit RACH signals via multiple spatial processors (e.g., Tx slices) without assuming channel reciprocity. By receiving the RACH signals and the follow-up messages via multiple spatial processors (e.g., Rx slices), the base station can derive the preferred uplink (MS Tx, BS Rx) slices. BS 102 transmits Synchronization (Sync), Broadcast Channel (BCH), Common Reference Signal (CRS) or Channel State Information Reference Signal (CSI-RS) in block 1320. MS 116 detects the downlink preferred (BS Tx, MS Rx) slices in block 1340. In block 1342, MS 116 transmits RACH signals via multiple spatial processors (e.g., Tx slices) without assuming channel reciprocity. BS 102 derives the preferred uplink (MS Tx, BS Rx) slices assuming channel reciprocity in block 1344. In block 1346, BS 102 configures MS LT-SRS codebook and allocates time-frequency resources.

Upon acquiring the uplink channel characteristics, for example, as represented by the preferred uplink (MS Tx, BS Rx) slices, BS 102 can configure the codebook and allocate time-frequency resources for LT-SRS transmission. BS 102 can also configure the codebook and allocate time-frequency resources for ST-SRS transmission. BS 102 communicates the MS LT-SRS codebook and time-frequency allocation to MS 116. In response, MS 116 transmits uplink LT-SRS and ST-SRS in block 1348.

In certain embodiments, the codebook for LT-SRS can be configured by number of precoders, selection of different precoders with different beamforming gain (or other type of spatial processing gain), and so forth. For example, if MS 116 is moving slowly, it may be advantageous to have a large LT-SRS codebook with each precoder has narrow beamwidth and high beamforming gain. Alternatively, if MS 116 is moving fast, it may be advantageous to have a small LT-SRS codebook with each precoder has wide beamwidth and low beamforming gain.

In certain embodiments, the codebook for ST-SRS can be configured by number of precoders, selection of different precoders with different beamforming gain (or other types of spatial processing gain), and the corresponding subspace of the spatial channel that the ST-SRS is intended to sound. The corresponding subspace of the spatial channel can be represented by the preferred uplink MS Tx slices. In the example shown in FIG. 11, the ST-SRS 1145 has four precoders, namely B0, B1, B2, and B3. These four precoders collectively provide sufficient coverage of the space domain of slice S1, which is the preferred uplink slice for MS 116. This method of choosing the ST-SRS codebook based on the preferred (or active) uplink slices can significantly reduce the overhead required for short-term channel sounding in the uplink.

In certain embodiments, the adaptation of the ST-SRS codebook according to the long-term spatial channel characteristics can be done by MS 116. For example, BS 102 can indicate to MS 116 the codebook to be used by ST-SRS 1145. MS 116 can then translate or remap the codebook to a transformed codebook according to the preferred uplink Tx slices. MS 116 then transmits the uplink ST-SRS 1145 using the transformed codebook and the time-frequency resources assigned by BS 102.

In certain embodiments, BS 102 also explicitly signals the preferred uplink BS Rx slices to MS 116. Although the Rx slices or other base station receiver spatial processing can be viewed as base station implementation that may not need to be signaled to MS 116, it can be advantageous for BS 102 to inform MS 116 the uplink BS Rx slices. For example, different uplink BS Rx slices can have different half-power beamwidth and thus different beamforming gains. It can be helpful for MS 116 to know the uplink BS Rx slices used in receiving a certain ST-SRS 1145 transmission such that MS 116 can properly set the uplink ST-SRS power level to ensure good reception quality of the ST-SRS 1145.

Figure 14A:
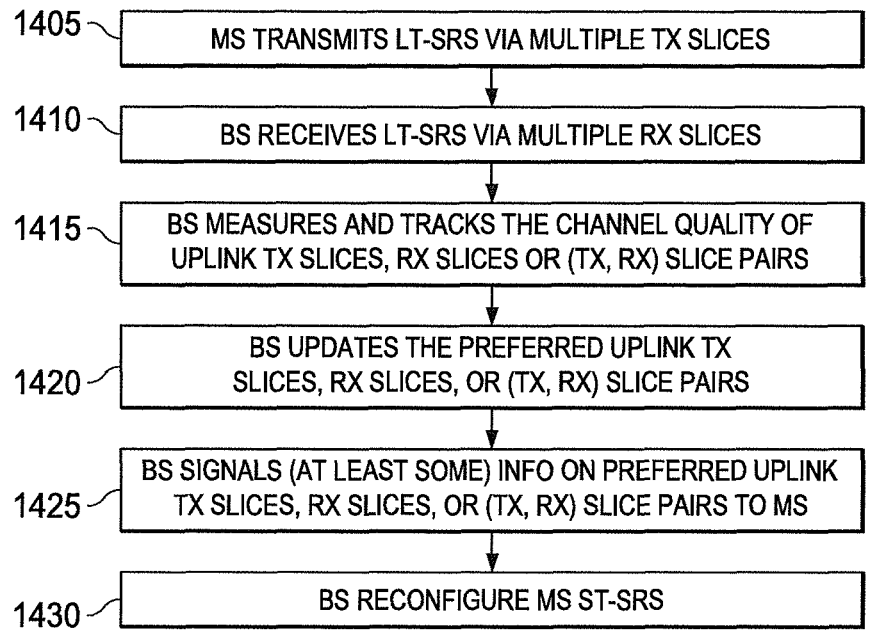
FIGS. 14A and 14B illustrate processes for channel sounding operations using LT-SRS and ST-SRS according to embodiments of the present disclosure.
Figure 14B:
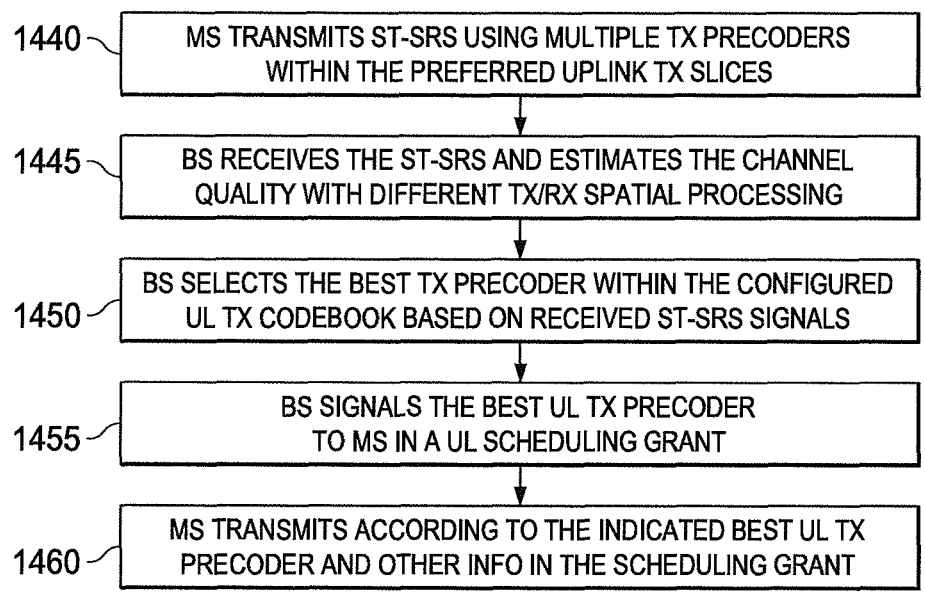

FIGS. 14A and 14B illustrate processes for channel sounding operations using LT-SRS and ST-SRS according to embodiments of the present disclosure. FIGS. 14A and 14B show two examples of how LT-SRS and ST-SRS can be used in uplink channel sounding. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the example depicted are implemented by a transmitter chain or a receiver chain in, for example, a base station or a mobile station.

In certain embodiments, as illustrated in FIG. 14A, MS 116 transmits the LT-SRS 1140 signals via different uplink Tx slices in block 1405. In block 1410, BS 102 receives the LT-SRS signals via different uplink Rx slices. BS 102 measures the link quality of each uplink Tx slices, or uplink Rx slices, or uplink (Tx, Rx) slice pairs in block 1415. For the purpose of illustration, it is assumed that the link quality is measured on a (Tx, Rx) slice pair basis. BS 102 updates the preferred uplink Tx slices, Rx slices or (Tx, Rx) slice pairs in block 1420. If the link quality of a (Tx, Rx) slice pair exceeds the link quality of the current preferred (or active) (Tx, Rx) slice pair, BS 102 can signal this change to MS 116, in block 1425, and trigger uplink slice switching. BS 102 signals information on the preferred uplink Tx slices, Rx slices or (Tx, Rx) slice pairs to MS 116. Upon successfully uplink slice switching for LT-SRS, BS 102 also reconfigures the ST-SRS because of the dependency between the ST-SRS codebook and the preferred (or active) slices in block 1430.

In certain embodiments, as illustrated in FIG. 14B, MS 116 transmits the ST-SRS signals via different uplink Tx precoders in block 1440. These uplink Tx precoders are defined in an uplink ST-SRS codebook that is configured or derived based on the long-term spatial channel information. BS 102 receives the ST-SRS and estimates the channel quality with different Tx/Rx spatial processing in block 1445. In block

1450, BS 102 selects the best Tx precoder within the configured UL Tx codebook based on the received ST-SRS signals. Unlike the processing for LT-SRS, BS 102 does not select the best uplink Tx slice. Instead, at least in one uplink transmission mode, another closed-loop MIMO codebook can be constructed based on the ST-SRS Tx precoders. BS 102 selects one precoder from the closed-loop MIMO codebook and indicates the selected precoder to MS 116 in the uplink scheduling grant in block 1455. MS 116 can then further synthesize the transmission precoder from the ST-SRS Tx precoders and the selected closed-loop MIMO precoder. MS 116 transmits according to the indicated best UL Tx precoder and other information in the scheduling grant in block 1460.

Figure 15:
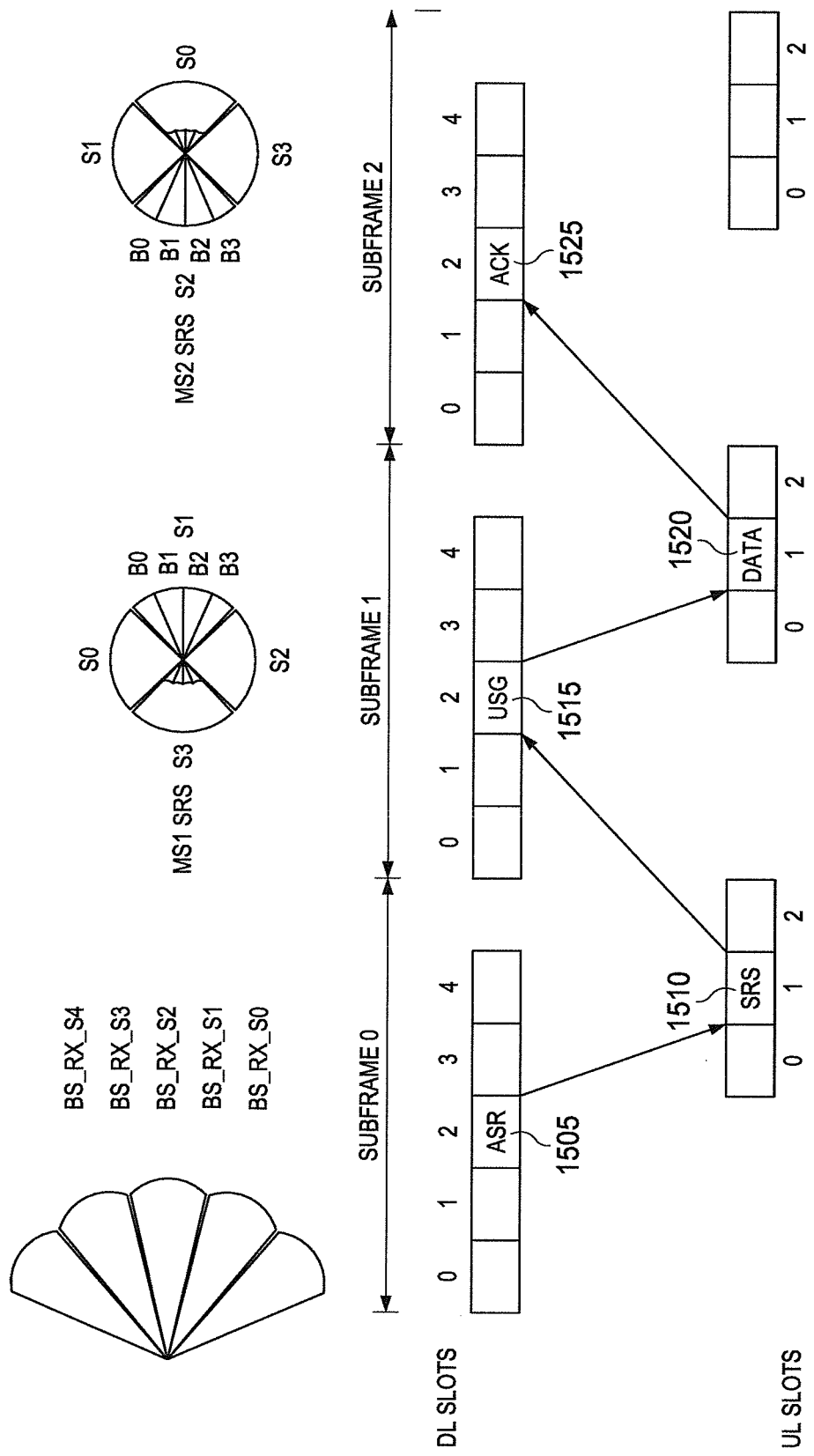
FIG. 15 illustrates an Aperiodic SRS request, transmission and associated UL scheduling grant and data channel operation according to embodiments of the present disclosure.

FIG. 15 illustrates an Aperiodic SRS request, transmission and associated UL scheduling grant and data channel operation according to embodiments of the present disclosure. The embodiment of the Aperiodic SRS request, transmission and associated UL scheduling grant and data channel operation shown in FIG. 15 is for illustration only. Other embodiments could be used without departing from the scope of this disclosure.

Operations for Periodic and Aperiodic Transmission of SRS

The LT-SRS and ST-SRS transmission can be either periodic or aperiodic.

For periodic LT-SRS (or ST-SRS) transmissions, the time-frequency resource allocation and the LT-SRS (or ST-SRS) transmission codebook can be configured. MS 116 transmits LT-SRS (or ST-SRS) periodically according to the configuration while BS 102 can receive the LT-SRS (or ST-SRS) periodically. BS 102 can then determine the best spatial processing strategy for MS 116 and send that information to MS 116 via the Uplink Scheduling Grant message (USG).

In certain embodiments, for aperiodic LT-SRS (or ST-SRS) transmissions, BS 102 assigns temporary time-frequency resources for SRS transmission. In the example shown in FIG. 15, an exemplary system operation of how aperiodic SRS is scheduled, transmitted, and utilized is shown as follows:

BS 102 sends an Aperiodic SRS Request (ASR) 1505 in DL Slot-2 in Subframe 0.

MS 116 detects the request and transmits aperiodic LT-SRS (or aperiodic ST-SRS) according to the configuration. The aperiodic LT-SRS (or aperiodic ST-SRS) is shown as "SRS" 1510 in UL Slot-1 of Subframe 0.

Upon receiving the aperiodic SRS 1510, BS 102 is able to estimate the best Tx/Rx strategy for the uplink, and the associated CQI. BS 102 can send an Uplink Scheduling Grant (USG) 1515 in DL Slot-2 in Subframe 2 to MS 116 to schedule for uplink data transmission.

Upon detecting the USG 1515, MS 116 can transmit uplink data 1520 according to the USG 1515. MS 116 transmits the data 1520 in UL Slot-1 of Subframe 1.

Upon detecting the packet, BS 102 sends an acknowledgement message (ACK) 1525 in the DL Slot-2 of Subframe 1.

This aperiodic SRS procedure is applicable to both LT-SRS 1140 and ST-SRS 1145. In addition, in certain embodiments, the Aperiodic SRS Request (ASR) is delivered in a physical layer control channel message as an element to avoid elaborated higher layer signaling and the associated delay. In that case, at least one aperiodic SRS configuration (for either aperiodic LT-SRS, or aperiodic ST-SRS) can be predetermined and configured before the ASR. The ASR can contain minimum amount of overhead such as 1 or 2 activation bits, and possibly few bits for selection of predetermined configurations for the aperiodic SRS transmissions.

Although various features have been shown in the figures and described above, various changes may be made to the figures. For example, the size, shape, arrangement, and layout of components shown in FIGS. 1 through 4, 6, 11, 12 and 15 are for illustration only. Each component could have any suitable size, shape, and dimensions, and multiple components could have any suitable arrangement and layout. Also, various components in FIGS. 1 through 4, 6, 11, 12 and 15 could be combined, further subdivided, or omitted and additional components could be added according to particular needs. Further, each component in a device or system could be implemented using any suitable structure(s) for performing the described function(s). In addition, while FIGS. 5, 7A, 7B, 8, 9, 10, 13A, 13B, 13C, 14A and 14B illustrate various series of steps, various steps in FIGS. 5, 7A, 7B, 8, 9, 10, 13A, 13B, 13C, 14A and 14B could overlap, occur in parallel, occur multiple times, or occur in a different order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a base station configured to communicate with a plurality of mobile stations, base station comprising:
    a transmit chain configured to transmit downlink timing synchronization and establish frequency synchronization with at least one of the plurality of mobile stations;
    a receive chain configured to receive, from the at least one of the plurality of mobile stations, at least one of: coarse sounding reference signal (SRS) and fine SRS; and
    processing circuitry configured to:
        enable tracking of a preferred uplink (UL) slice for uplink transmission by processing at least one of the coarse SRS,
        resolve a short-term small-scale channel state information (CSI) by processing the fine SRS,
        estimate a CSI from at least one of the coarse SRS and fine SRS, and
        perform uplink scheduling and grant;
    wherein the receive chain is configured to receive multiple random access (RACH) probes transmitted by the at least one of the plurality of mobile stations in multiple slices, and
    wherein the processing circuitry is configured to detect the multiple RACH probes, measure at least one of signal strength and quality of the detected RACH probes, and determine which RACH probe associated with a certain uplink transmit (Tx) spatial processing scheme is preferable.

2. The base station as set forth in claim 1, wherein the processing circuitry is configured to detect uplink RACH probes using different uplink receive (Rx) spatial processing, measure at least one of the signal strength and quality of the detected uplink RACH probes, and determine which uplink RACH probe associated with a pair of certain uplink Tx spatial processing and Rx spatial processing is preferable.

3. The base station as set forth in claim 2, wherein the processing circuitry is configured to derive an uplink preferred slice based on the received RACH probes.

4. The base station as set forth in claim 1, wherein the processing circuitry is configured to process the coarse SRS to determine whether a blade switching criteria has been met.

5. The base station as set forth in claim 1, wherein the processing circuitry is configured to process the fine SRS if the blade switching criteria has been met.

6. The base station as set forth in claim 1, wherein the receive chain is configured to receive long term SRS signals using different spatial processors in different subframes.

7. The base station as set forth in claim 6, wherein the receive chain is configured to use a first spatial processor to receive a first SRS signal in a first SRS symbol, and use a second spatial processor different from the first spatial processor to receive a second SRS signal in a second SRS symbol.

8. The base station as set forth in claim 1, wherein the receive chain is configured to receive feedback from the at least one of the plurality of mobile stations, the feedback comprising information on a downlink preferred slice, and wherein the processing circuitry is configured to derive an uplink preferred slice based on the feedback.

9. The base station as set forth in claim 1, wherein the processing circuitry is configured to configure mobile station uplink long term SRS and short term SRS.

10. A mobile station configured to communicate with at least one base station, the mobile station comprising:
 a transceiver configured to transmit multiple random access channel (RACH) probes using different uplink Tx beamforming and at least one of coarse sounding reference signal (SRS) for tracking a preferred uplink (UL) slice for uplink transmission and fine SRS for resolving a short-term small-scale channel state information (CSI) and receive downlink timing synchronization from the at least one base station, the different uplink Tx beamforming comprising a plurality of uplink beams and slices and establish frequency synchronization with the at least one base station and wherein the transceiver is configured to receive communications from the base station via a plurality of downlink beams and slices; and
 processing circuitry configured to determine at least one preferred uplink (UL) spatial processing configuration and negotiate, with the at least one base station, the at least one preferred uplink (UL) spatial processing configuration for a sounding reference signal (SRS), and perform uplink scheduling request and uplink data communication,
 wherein the RACH probes are configured to be detected by the at least one base station, and, as a function of a measurement of at least one of signal strength and quality of the detected RACH probes, to indicate which RACH probe associated with a certain uplink transmit (Tx) spatial processing scheme is preferable.

11. The mobile station as set forth in claim 10, wherein the processing circuitry is configured to detect a downlink preferred slice.

12. The mobile station as set forth in claim 11, wherein the processing circuitry is configured to derive an uplink preferred slice.

13. The mobile station as set forth in claim 12, wherein the processing circuitry is configured to cause the transceiver to feedback the derived uplink preferred slice.

14. The mobile station as set forth in claim 10, wherein the processing circuitry is configured to cause the transceiver to transmit at least one of long term SRS and short term SRS in at least one of a plurality of symbols within a slot contained within a subframe.

15. The mobile station as set forth in claim 10, wherein the processing circuitry is configured to cause the transceiver to transmit at least one of the long term SRS and the short term SRS signals via multiple spatial processors in different time-frequency transmission opportunities.

16. The mobile station as set forth in claim 10, wherein the processing circuitry is configured to cause the transceiver to use a first spatial processor to transmit a first SRS signal in a first SRS symbol, and use a second spatial processor, different from the first spatial processor, to transmit a second SRS signal in a second SRS symbol.

17. For use in a wireless communications network, a method for communicating with a plurality of mobile stations, the method comprising:
 transmitting downlink timing synchronization and establishing frequency synchronization with at least one of the plurality of mobile stations;
 receiving, from the at least one of the plurality of mobile stations, at least one of: coarse sounding reference signal (SRS), and fine SRS;
 processing at least one of the coarse SRS to enable tracking of the preferred uplink (UL) slice for uplink transmissions, and the fine SRS in order to resolve a short-term small-scale channel state information (CSI), estimate a CSI from at least one of the coarse SRS and fine SRS, perform uplink scheduling and grant;
 receiving multiple random access (RACH) probes transmitted by the at least one of the plurality of mobile stations in multiple slices;
 detecting the multiple RACH probes;
 measuring at least one of signal strength and quality of the detected RACH probes; and
 determining which RACH probe associated with a certain uplink transmit (Tx) spatial processing scheme is preferable.

18. The method as set forth in claim 17, further comprising deriving an uplink preferred slice.

19. The method as set forth in claim 18, wherein the uplink preferred slice is derived based on at least one of:
 a feedback from the at least one of a plurality of mobile stations; and
 the random access (RACH) probe.

* * * * *